US009646233B2

(12) United States Patent
Sugiura et al.

(10) Patent No.: US 9,646,233 B2
(45) Date of Patent: May 9, 2017

(54) IMAGE FORMING APPARATUS AND NON-TRANSITORY COMPUTER READABLE RECORDING MEDIUM FOR IMPROVED EMAIL PRINTING

(71) Applicant: KONICA MINOLTA, INC., Chiyoda-ku (JP)

(72) Inventors: Hiroshi Sugiura, Toyokawa (JP); Mie Kawabata, Toyokawa (JP); Toshimi Shinchi, Toyokawa (JP); Atsushi Tomita, Toyohashi (JP); Tomoko Maruyama, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 100 days.

(21) Appl. No.: 13/915,959

(22) Filed: Jun. 12, 2013

(65) Prior Publication Data
US 2013/0335771 A1 Dec. 19, 2013

(30) Foreign Application Priority Data

Jun. 18, 2012 (JP) ................. 2012-136526

(51) Int. Cl.
G06K 15/00 (2006.01)
G06K 15/02 (2006.01)
(Continued)

(52) U.S. Cl.
CPC ......... *G06K 15/408* (2013.01); *G06F 3/1203* (2013.01); *G06F 3/1274* (2013.01);
(Continued)

(58) Field of Classification Search
CPC ........ H04N 1/00; G06F 15/00; G06K 15/408; G06K 15/02
See application file for complete search history.

(56) References Cited

U.S. PATENT DOCUMENTS

2002/0118396 A1 8/2002 Kawai
2002/0157028 A1* 10/2002 Koue ................ H04L 9/32
726/3
(Continued)

FOREIGN PATENT DOCUMENTS

JP 11-252165 A 9/1999
JP 2001-236274 A 8/2001
(Continued)

OTHER PUBLICATIONS

Office Action issued on Aug. 12, 2014, by the Japanese Patent Office in corresponding Japanese Patent Application No. 2012-136526 and an English translation of the Office Action. (10 pages).

*Primary Examiner* — Henok A Shiferaw
(74) *Attorney, Agent, or Firm* — Buchanan Ingersoll & Rooney PC

(57) ABSTRACT

An image forming apparatus, comprises: a receiving part for receiving an email at a predetermined time; a print outputting part for producing a printed output of data contained in the received email; a stop controlling part for temporarily suspending the receiving process by the receiving part or the process to produce the printed output by the print outputting part; a determining part for receiving an input of instruction information specifying a processing to process the received email and determining the processing to process the received email in accordance with the input instruction information while the stop controlling part is temporarily suspending the process; and an email processing part for performing the processing determined by the determining part to process the received email while the process is being temporarily suspended by the stop controlling part or after the temporary suspension by the stop controlling part is cancelled.

28 Claims, 20 Drawing Sheets

(51) Int. Cl.
*G06F 3/12* (2006.01)
*H04N 1/00* (2006.01)

(52) U.S. Cl.
CPC ......... *G06F 3/1285* (2013.01); *G06K 15/181* (2013.01); *G06K 15/1806* (2013.01); *H04N 1/00212* (2013.01); *H04N 1/00233* (2013.01); *H04N 1/00917* (2013.01); *G06F 3/122* (2013.01); *G06F 3/1228* (2013.01); *G06F 3/1267* (2013.01)

(56) References Cited

U.S. PATENT DOCUMENTS

| | | | | |
|---|---|---|---|---|
| 2008/0068646 | A1* | 3/2008 | Kobayashi | 358/1.15 |
| 2008/0239371 | A1* | 10/2008 | Sato | H04N 1/32117 358/1.15 |
| 2008/0307059 | A1* | 12/2008 | Ono | G03G 21/02 709/206 |
| 2009/0040547 | A1* | 2/2009 | Ferlitsch | 358/1.15 |
| 2010/0174794 | A1* | 7/2010 | Ochi | G06Q 10/107 709/206 |

FOREIGN PATENT DOCUMENTS

| | | |
|---|---|---|
| JP | 2002-259025 A | 9/2002 |
| JP | 2003-226047 A | 8/2003 |
| JP | 2004-342038 A | 12/2004 |
| JP | 2005-222213 A | 8/2005 |
| JP | 2006-221464 A | 8/2006 |
| JP | 2009-059274 A | 3/2009 |
| JP | 2010-160631 A | 7/2010 |

\* cited by examiner

IMAGE FORMING APPARATUS AND NON-TRANSITORY COMPUTER READABLE RECORDING MEDIUM FOR IMPROVED EMAIL PRINTING

This application is based on the application No. 2012-136526 filed in Japan, the contents of which are hereby incorporated by reference.

BACKGROUND OF THE INVENTION

Field of the Invention

The present invention relates to an image forming apparatus and a non-transitory computer readable recording medium.

Description of the Background Art

Conventional image forming apparatuses called as network printers or MFPs (Multi-functional peripherals) having email print function are known. This email print function is to produce a printed output in response to receiving an email addressed to itself by processing the email as a print job are known. This known technique is introduced for example in Japanese Patent Application Laid-Open No. JP 2006-221464 A.

In recent years, portable terminals such as smart phones or tablet terminals have become widely popular. This type of portable terminals allows users to easily process document data and offers user-friendliness. The portable terminals, however, do not have printer drivers the same as those installed on general personal computers (PC) installed thereon. When the user operating the portable terminal would like to have printed outputs produced based on the document data, he or she sends an email containing the document data to the image forming apparatus including the aforementioned email print function. Thus, the portable terminal which does not have the printer driver installed thereon is allowed to send a print job to the image forming apparatus.

For having a printed output using email print function on the image forming apparatus, the user attaches the document data to an email and sends the email. In some cases, the user attaches a wrong file by not absolutely checking the file before attaching it. As a result, unintended document may be produced as a printed output.

Once the email is sent from the portable terminal, the print job sent to the image forming apparatus is not allowed to be cancelled by operating the portable terminal even if the user noticed that he or she has attached the wrong document data. Because of this, the conventional email print function results in high frequency of miss prints.

SUMMARY OF THE INVENTION

The present invention is intended to solve the above problems. Thus, the present invention is intended to provide an image forming apparatus and a non-transitory computer readable recording medium capable of improving user-friendliness of email print function by allowing a user to easily cancel a print job sent with an email or to make change in settings such as print settings relating to the print job.

First, the present invention is directed to an image forming apparatus.

According to an aspect of the image forming apparatus, the image forming apparatus comprises: a receiving part for receiving an email at a predetermined time; a print outputting part for producing a printed output of data contained in the email received by the receiving part; a stop controlling part for temporarily suspending the receiving process by the receiving part or the process to produce the printed output by the print outputting part without making it carry out; a determining part for receiving an input of instruction information specifying a processing to process the email received by the receiving part and determining the processing to process the email received by the receiving part in accordance with the input instruction information while the stop controlling part is temporarily suspending the process; and an email processing part for performing the processing determined by the determining part to process the email received by the receiving part while the process is being temporarily suspended by the stop controlling part or after the temporary suspension by the stop controlling part is cancelled.

Second, the present invention is directed to a non-transitory computer readable recording medium on which a program is recorded. The program is executable on an image forming apparatus capable of producing a printed output of data contained in a received email.

According to an aspect of the non-transitory computer readable recording medium, the program executed on the image forming apparatus to function as a system comprises: a receiving part for receiving an email at a predetermined time; a print controlling part for controlling a process to produce the printed output of the data contained in the email received by the receiving part; a stop controlling part for temporarily suspending the receiving process by the receiving part or the process to produce the printed output by the print controlling part without making it carry out; a determining part for receiving an input of instruction information specifying a processing to process the email received by the receiving part, and determining the processing to process the email received by the receiving part in accordance with the input instruction information while the stop controlling part is temporarily suspending the process; and an email processing part for performing the processing determined by the determining part to process the email received by the receiving part while the process is being temporarily suspended by the stop controlling part or after the temporary suspension by the stop controlling part is cancelled.

DESCRIPTION OF THE PRESENT PREFERRED EMBODIMENTS

Figure 1:
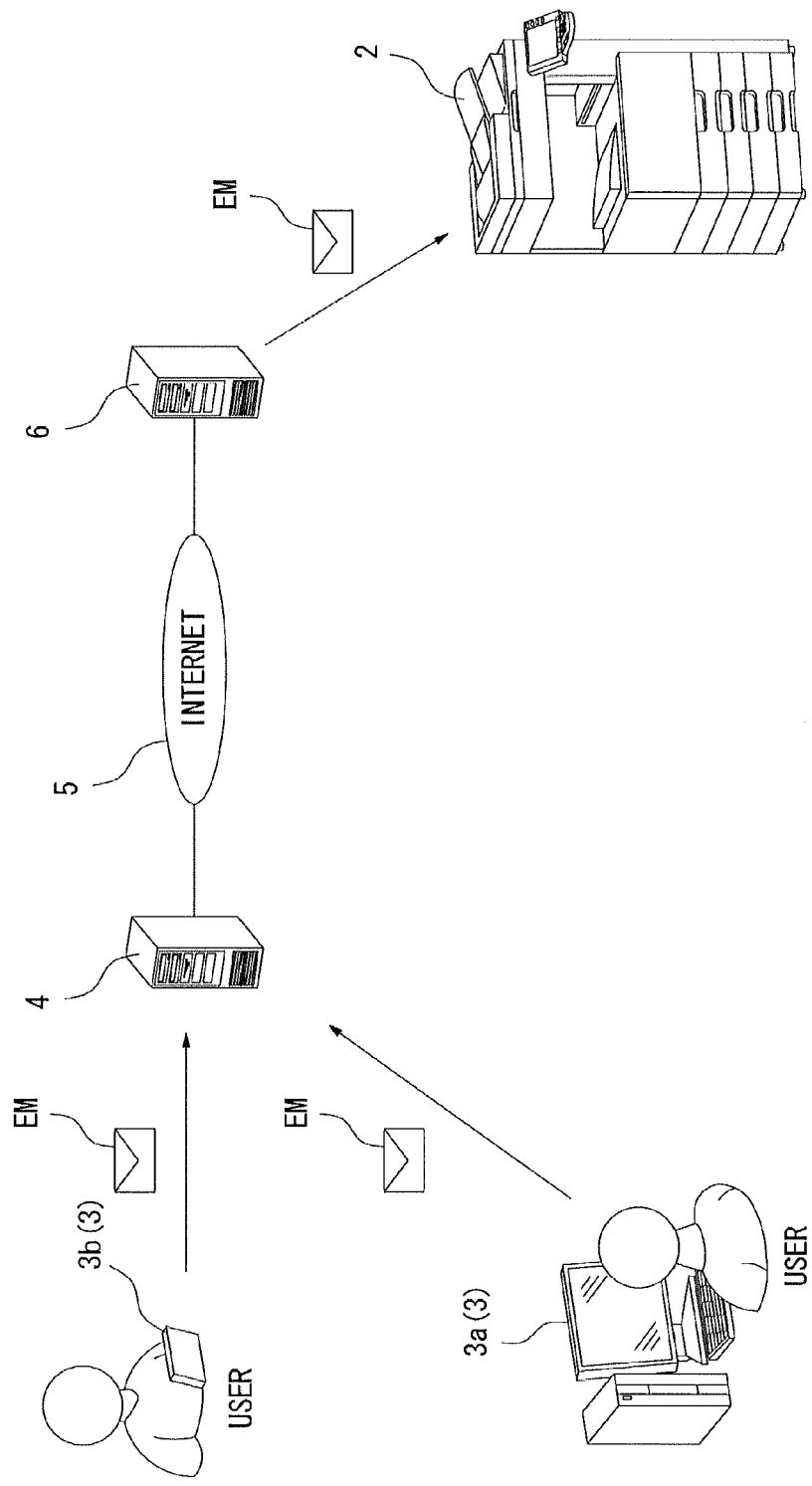
FIG. 1 shows an exemplary configuration of an image forming system.

Preferred embodiments of the present invention are described in detail below with reference to figures. In the description given below, those elements which are shared in common among figures are represented by the same reference numerals, and these elements are not discussed repeatedly for the same description.

Basic Preferred Embodiment

FIG. 1 shows an exemplary configuration of an image forming system 1 of the basic preferred embodiment. The image forming system 1 comprises an image forming apparatus 2 formed from a device such as one of MFPs, a terminal device 3 used by a user, a SMTP (Simple Mail Transfer Protocol) server 4 and a POP (Post Office Protocol) server 6. Those devices are connected over a network including an internet 5. The terminal device 3 may be a desktop terminal 3a formed from a device such as a general personal computer or a portable terminal 3b formed from a smart phone or a tablet terminal. The image forming apparatus 2 of the basic preferred embodiment supports email print function. In response to receiving an email addressed to itself, the image forming apparatus 2 is capable of producing a printed output by processing data contained in the received email as a print job.

Basic operations of the image forming apparatus 2 when activating email print function are explained next. An email EM that is sent from the terminal device 3 and that designates an email address of the image forming apparatus 2 as a recipient is sent to the SMTP server 4 and forwarded to the POP server 6 over the network such as the internet 5 from the SMTP server 4. A mail receiving interval for receiving the email EM addressed to itself from the POP server 6 is set in advance with the image forming apparatus 2. Based on the set mail receiving interval, the image forming apparatus 2 accesses the POP server 6 at the time to receive the email, and performs an email receiving process. In response to receiving the email EM from the terminal device 3, the image forming apparatus 2 produces a printed output based on the received email EM. If any file such as document data is attached to the received email EM, the printed output is produced based on the attachment file. If there is no file attached to the email EM, the image forming apparatus 2 produces the printed output based on the text in the body of the received email EM. With a command specifying print settings in a subject line of the received email EM, the image forming apparatus 2 applies the print settings according to the command and produces the printed output based on the updated print settings. With no command specifying print settings in the subject line of the email EM, the image forming apparatus 2 applies the settings configured with email print function by default and produces the printed output based on the default settings. The print settings include color and black/white setting, N in 1 setting to print multiple (N) pages per sheet, duplex setting to specify 2-sided or 1-sided print, paper size setting to specify size of printed paper, and magnification selling for print output.

Figure 2:
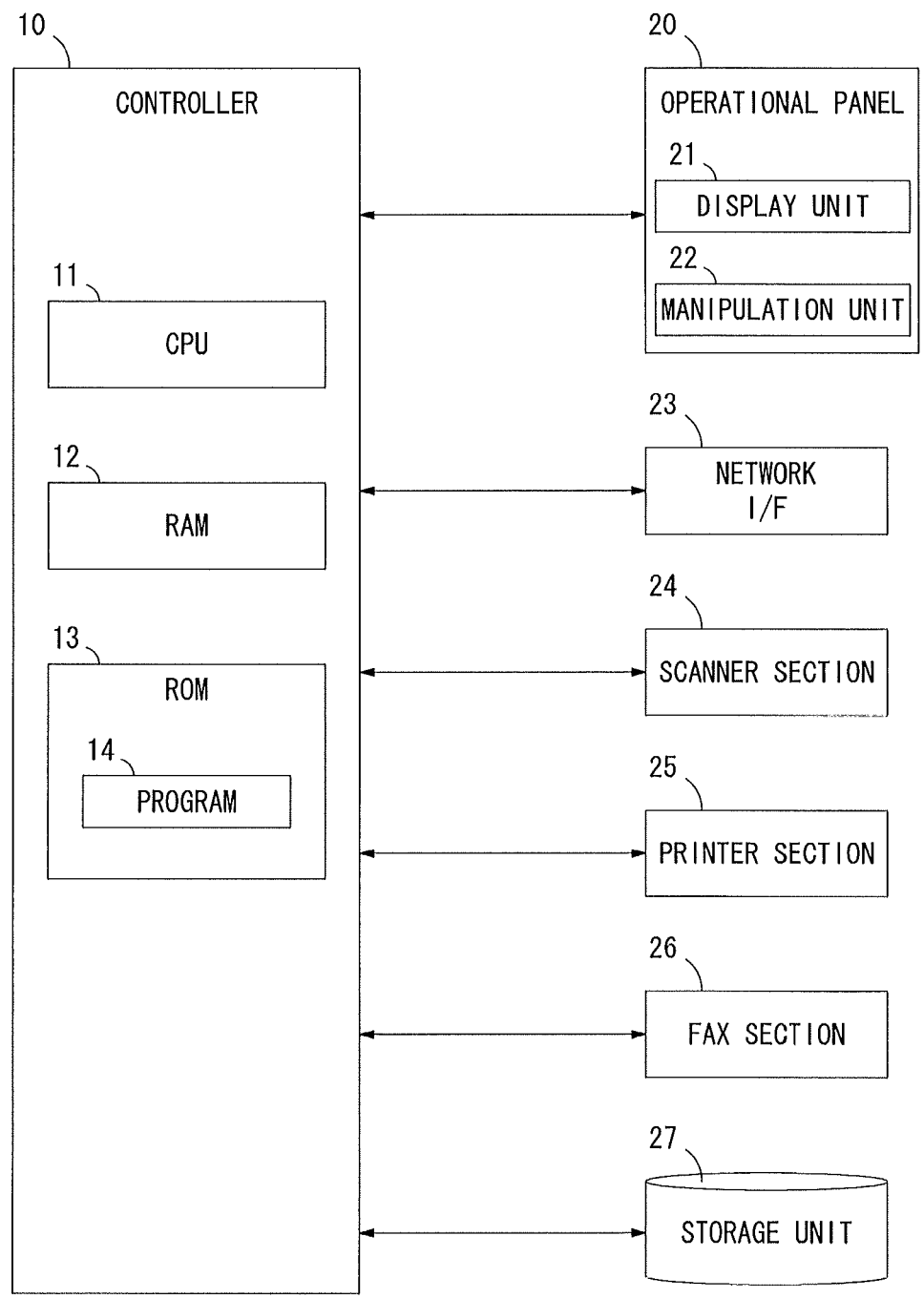
FIG. 2 is a block diagram showing an exemplary hardware configuration of an image forming apparatus.

FIG. 2 is a block diagram showing an exemplary hardware configuration of the image forming apparatus 2. As illustrated in FIG. 2, the image forming apparatus 2 includes a controller 10, an operational panel 20, a network interface 23, a scanner section 24, a printer section 25, a fax section 26 and a storage unit 27.

The controller 10 controls operations of each of the operational panel 20, the network interface 23, the scanner section 24, the printer section 25, the fax section 26 and the storage unit 27, and controls operations performed in response to activating the aforementioned email print function. The operational panel 20, a user interface directly operable by a user in use of the image forming apparatus 2, is provided with a display unit 21 on which various types of information is displayed and a manipulation unit 22 that receives inputs of a variety of instructions by the user. The network interface 23 is for connecting the image forming apparatus 2 to the network such as LAN (Local Area Network) and serves as an interface for receiving the email EM. The scanner section 24 is driven to read a document and generate image data thereof in response to an instruction from the controller 10. The printer section 25 is driven to produce a printed output by forming an image on a sheet such as a printing sheet based on print data received from the controller 10. The fax section 26 transmits and receives fax data over a network such as public phone lines not shown in figures. The storage unit 27 is formed from a nonvolatile storage device such as a hard disk drive, for instance, to store therein the received email EM and/or other data.

As shown in FIG. 2, the controller 10 includes a CPU 11, a RAM 12 and a ROM 13. The CPU 11 is a computation unit that reads and executes a program 14 stored in the ROM 13. The RAM 12 stores therein data such as temporary data required in accordance with execution of the program 14 by the CPU 11. The ROM 13 is formed from a nonvolatile memory, in which a variety of data besides the above-described program 14 is stored in advance.

The CPU 11 reads and executes the program 14 in the ROM 13 after the image forming apparatus 2 is powered on, thereby bringing the whole part of the controller 10 into operation to serve as various types of processing parts. Especially in the basic preferred embodiment, with execution of the program 14 by the CPU 11, the aforementioned email print function is allowed to be activated in the image forming apparatus 2.

Figure 3:
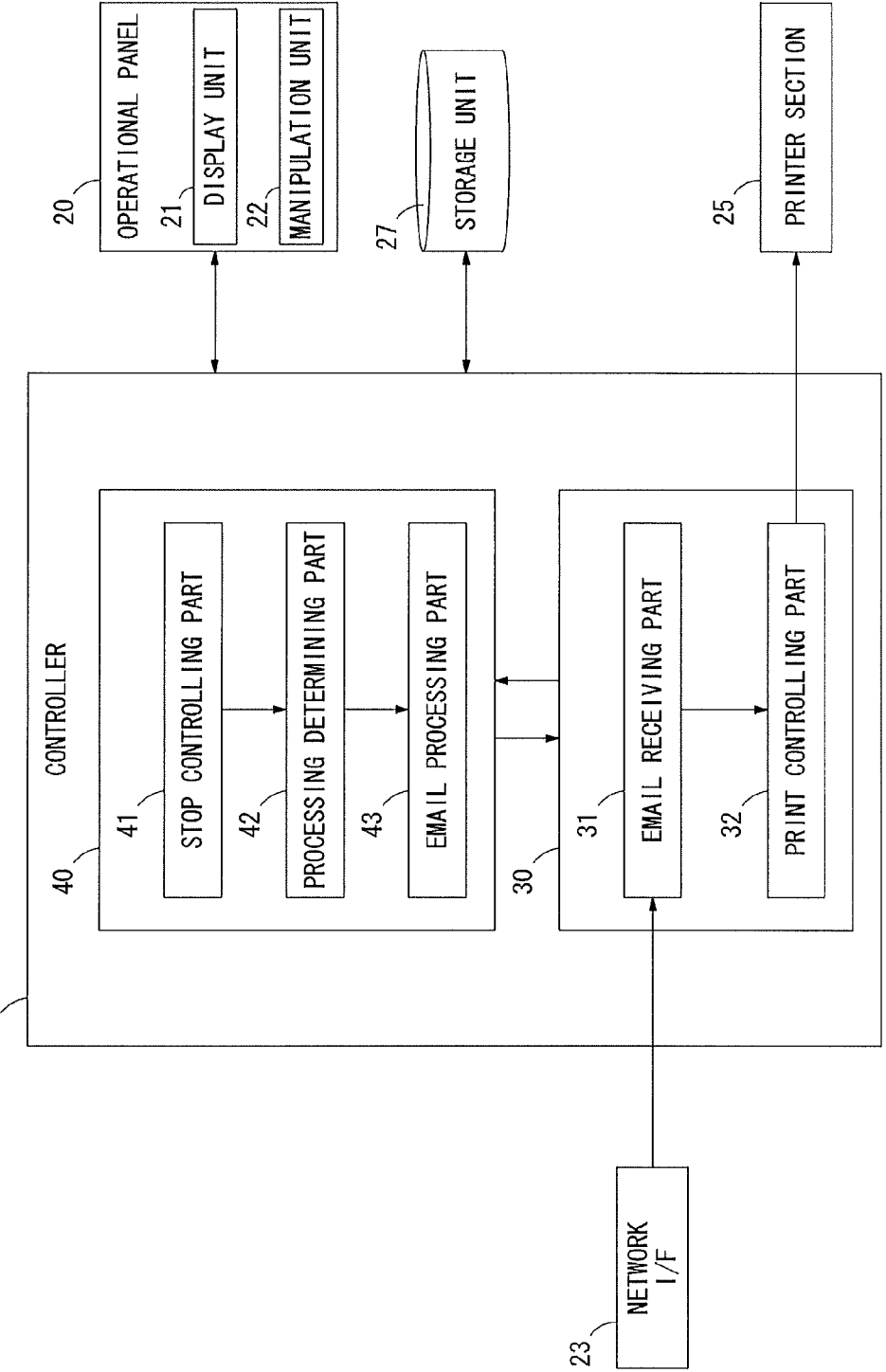
FIG. 3 is a block diagram showing an exemplary functional configuration of a controller on the image forming apparatus.

FIG. 3 is a block diagram showing an exemplary functional configuration of the controller 10 realized by execution of the program 14 by the CPU 11. In the example of FIG. 3, the exemplary functional configuration only relating to email print function is shown. As shown in FIG. 3, upon execution of the program 14 by the CPU 11, the controller 10 serves as a print processing part 30 which performs basic operations relating to email print and a control functioning part 40 that controls the operations of the print processing part 30.

The print processing part 30 includes an email receiving part 31 and a print controlling part 32. The email receiving part 31 accesses the POP server 6 via the network interface 23 at the time to receive the email based on the predetermined mail receiving interval, and performs the email receiving process to receive the email addressed to itself. The email receiving part 31 receives the email EM if there is the email EM addressed to itself saved in the POP server 6. After the email receiving part 31 receives the email EM, the print controlling part 32 obtains the email EM thereby received and outputs the obtained email EM to the printer section 25, thereby causing the printer section 25 to produce the printed output.

The control functioning part 40 includes a stop controlling part 41, a processing determining part 42 and an email processing part 43.

The stop controlling part 41 temporarily suspends the operations of the aforementioned print processing part 30. To be more specific, the stop controlling part 41 temporarily suspends either or both of the email receiving process by the email receiving part 31 and the process to produce the printed output by the print controlling part 32 without causing it or them to perform. After the email receiving part 31 receives the email EM, the stop controlling part 41 temporarily suspends the rest of the process on the received email EM. Alternatively, when the manipulation unit 22 of the operational panel 20 detects that a predetermined input is made by the user, the stop controlling part 41 temporarily suspends the rest of the email receiving process and/or the process to produce the printed output based on the received email. While the stop controlling part 41 is temporarily suspending the process, it is able to control not to produce the printed output based on the email EM even when the email receiving part 31 receives the email EM.

The processing determining part 42 receives an input of instruction information specifying the processing to process the email EM and determines the processing to process the email EM which has already been received by the email receiving part 31 or the email EM to be received sometime in accordance with the instruction information while the stop controlling part 41 is temporarily suspending the process.

The processing determining part 42 determines the processing to process the email EM received as the print job in accordance with the email containing the instruction information received by the email receiving part 31 or the instruction information received through the manipulation unit 22 of the operational panel 20.

The email processing part 43 performs the processing determined by the processing determining part 42 to process the email EM received by the email receiving part 31 during the temporary suspension by the stop controlling part 41 or after the temporary suspension is cancelled. The processing performed by the email processing part 43 to process the email EM includes deletion of the email EM, making change in the print settings for producing the printed output based on the email EM and making change in the attachment file to print, for example. The email processing part 43 performs the processing determined by the processing determining part 42 among from the multiple processing.

The control functioning part 40 temporarily suspends the process performed by the print processing part 30, thereby receiving the input of the instruction information specifying the processing to process the email EM during the suspension. The user using the terminal device 3 may send the email EM by mistake to the image forming apparatus 2. Even in such a case, the instruction information is input to the image forming apparatus 2 while the process on the email EM is being suspended so that the image forming apparatus 2 is allowed to delete the received email EM or to make change in the print settings.

As its basic structure, the image forming apparatus 2 of the basic preferred embodiment includes the email receiving part 31, the printer section 25, the stop controlling part 41, the processing determining part 42 and the email processing part 43. To be more specific, the email receiving part 31 receives the email EM at the predetermined time to receive the email, and the printer section 25 produces the printed output based on the email EM received by the email receiving part 31. The stop controlling part 41 temporarily suspends the process without making the email receiving part 31 perform the receiving process or the printer section 25 produce the printed output. The processing determining part 42 receives the input of the instruction information specifying the processing to process the email EM received by the email receiving part 31 and determines the processing to process the email EM received by the email receiving part 31 in accordance with the instruction information while the stop controlling part 41 is temporarily suspending the process. The email processing part 43 performs the processing determined by the processing determining part 42 to process the email EM received by the email receiving part 31 during the temporary suspension by the stop controlling part 41 or after the temporary suspension is cancelled. Even when receiving the email EM sent by mistake by the user, the image forming apparatus 2 of the basic preferred embodiment with these processing parts is allowed to cancel the print job without producing the printed output based on the received email EM or to produce the printed output after changing the print settings that the user desires. Thus, the image forming apparatus 2 of the basic preferred embodiment is capable of improving user-friendliness of the email print function compared to conventional devices.

The detailed structure and operations of the above-mentioned image forming apparatus 2 are described by giving examples of preferred embodiments next.

First Preferred Embodiment

The first preferred embodiment is explained first. It is assumed that the user sends the wrong email by mistake from the terminal device 3 to the image forming apparatus 2. In such a case, according to the first preferred embodiment, the user continues operating the terminal device 3 to send an email containing the instruction information specifying the processing to process the email previously sent, thereby causing the image forming apparatus 2 to perform the processing in accordance with the instruction information to process the previous email. In order to realize this, the image forming apparatus 2 of the first preferred embodiment is configured to save the email EM sent to itself in the storage unit 27 for a predetermined period of time as the email receiving part 31 receives the email EM. As a result, the image forming apparatus 2 of the first preferred embodiment is allowed to temporarily suspend the process to produce the printed output by the print controlling part 32.

Figure 4:
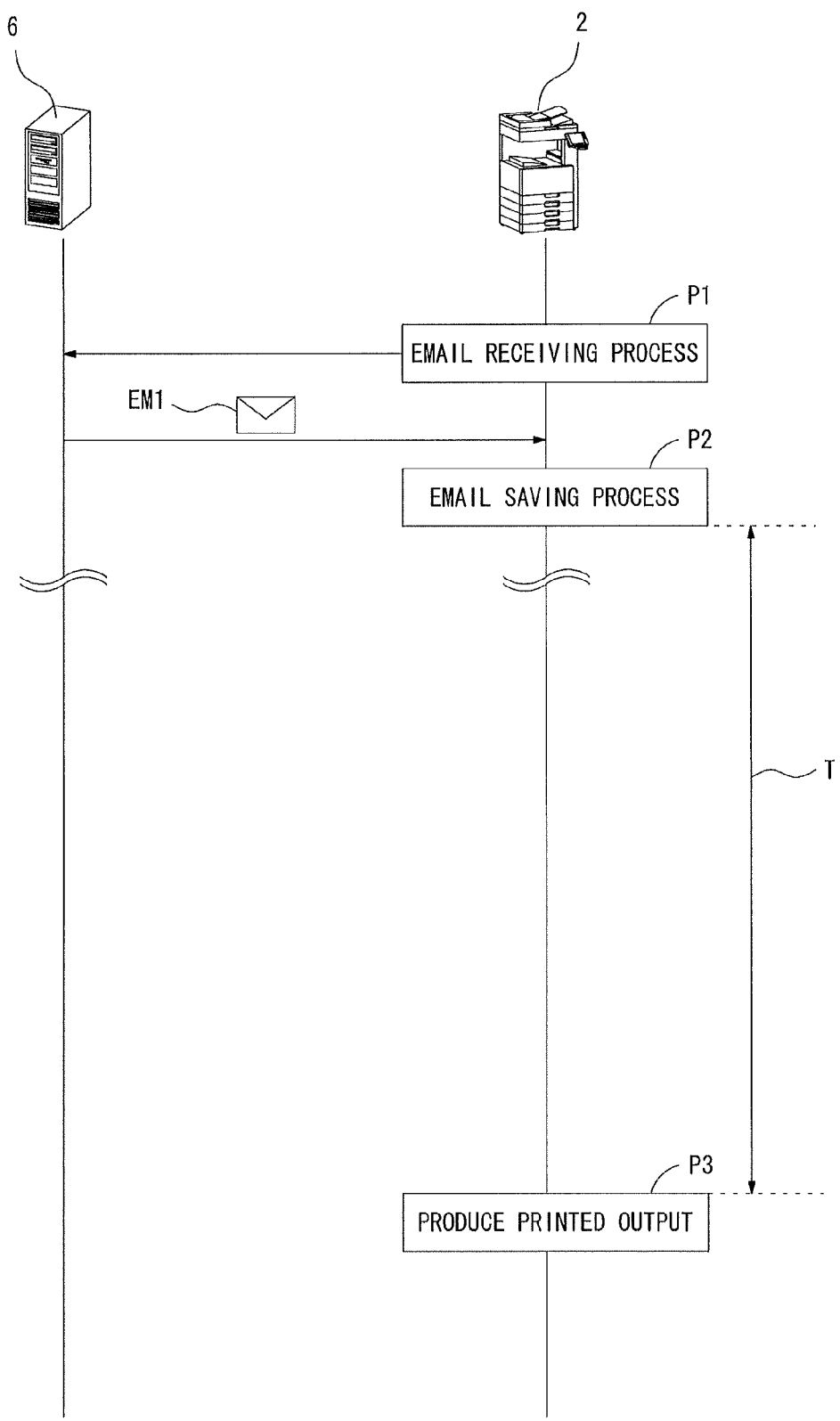
FIG. 4 is a flow diagram explaining an exemplary sequential procedure to produce a printed output in a normal way on the image forming apparatus by activating email print function.

FIG. 4 is a flow diagram explaining an exemplary sequential procedure to produce the printed output in a normal way on the image forming apparatus 2 by activating email print function. In response to detecting that it is the time to receive the email, the image forming apparatus 2 causes the email receiving part 31 to perform the email receiving process (process P1). When an email EM1 addressed to the image forming apparatus 2 is saved in the POP server 6, the email receiving part 31 obtains the email EM1. As the email receiving part 31 receives the email EM1 from the POP server 6, the stop controlling part 41 is brought into operation on the controller 10 to perform the email saving process to save the email EM1 thereby received in the storage unit 27 (process P2). In response to performing the email saving process, the stop controlling part 41 activates an internal timer which is not shown in figures to start measuring a time, and temporarily suspends the process on the email EM1 saved in the storage unit 27 until the time at which a predetermined period of time T has elapsed from the starting time. The predetermined period of time T is preferably set to a longer time than the mail receiving interval for automatically receiving the email by the email receiving part 31. If 5 minutes is configured as the mail receiving interval, for example, the time longer than 5 minutes shall be configured as the predetermined period of time T. As shown in FIG. 4, if no new email is received before the predetermined period of time T has elapsed, the stop controlling part 41 cancels the temporary suspension. The print controlling part 32 then reads the email EM1 saved in the storage unit 27 and outputs the print job based on the read email EM1 to the printer section 25, thereby causing the printer section 25 to produce the printed output (process P3). As described above, the image forming apparatus 2 of the first preferred embodiment is configured to cause a time lag of the predetermined period of time T before starting the process to produce the printed output after receiving the email EM1.

Figure 5:
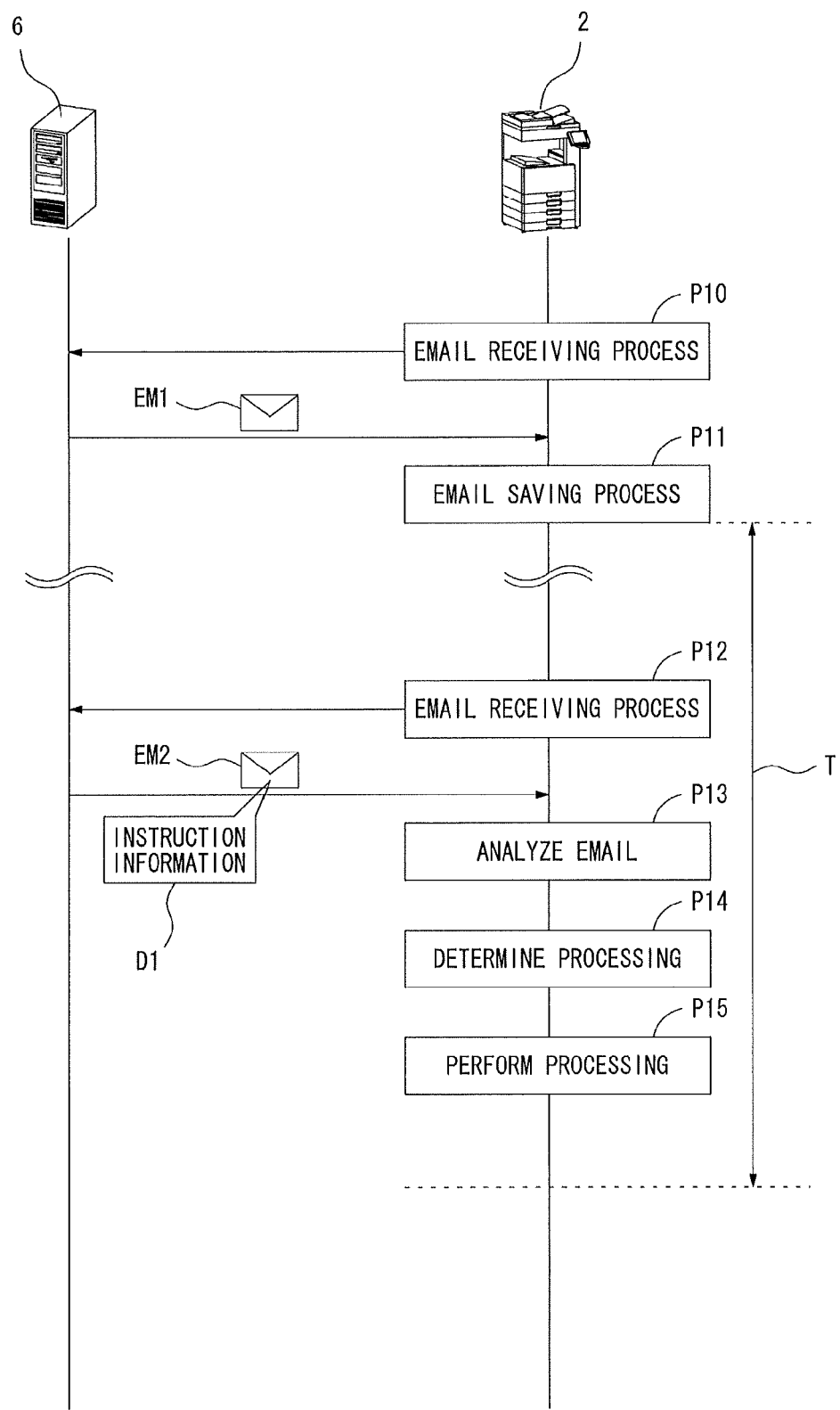
FIG. 5 is a flow diagram explaining an exemplary sequential procedure to cancel producing the printed output or to make change in settings by activating email print function in a first preferred embodiment.

FIG. 5 is a flow diagram explaining an exemplary sequential procedure to cancel producing the printed output or to make change in the settings on the image forming apparatus 2 by activating email print function. The exemplary sequential procedure of FIG. 5 characterizes the first preferred embodiment. The processes P10 and P11 to temporarily suspend the process on the email EM1 until the time at which the predetermined period of time T has elapsed from the time at which the email EM1 is saved in the storage unit 27 after the image forming apparatus 2 receives the email EM1 are the same as processes P1 and P2 of FIG. 4.

The email EM1 sent by mistake by the user from the terminal device 3 may be saved in the storage unit 27 by the image forming apparatus 2 in the process P11, for example. In such a case, the user may notice that he or she has sent the wrong email EM1 by mistake before the printed output is produced based on the email EM1. The user then again uses the terminal device 3 to send an email EM2 containing instruction information D1 specifying the processing to process the previous email EM1 to the image forming apparatus 2, thereby giving an instruction on the processing to process the email EM1 previously sent to the image forming apparatus 2.

According to the first preferred embodiment, when the user would like to cancel the print job based on the previously sent email EM1, he or she sends the email EM2 having the same information in the subject line and the text body as the previously sent email EM1 or the blank email EM2 having blank subject line and text body. If the user would like to make change in the print settings for the previously sent email EM1, he or she edits the sent email EM1, thereby rewriting the command specifying the print settings contained in the line such as the subject line to the desired one and sending the email EM2 containing the desired command. If the user would like to change the file to print, he or she changes the file attached to the previously sent email EM1 to the desired one and sends the email EM2 containing the desired attachment file. Any of these emails EM2 received by the image forming apparatus 2 is processed as the email EM2 containing the instruction information D1.

In response to detecting that it is the time to receive the email while temporarily suspending the process on the email EM1 saved in the process P11, the image forming apparatus 2 causes the email receiving part 31 to perform again the email receiving process (process P12). When there is the email EM2 addressed to the image forming apparatus 2 saved in the POP server 6, the email receiving part 31 obtains the saved email EM2.

After the email receiving part 31 obtains the new email EM2 during the temporary suspension by the stop controlling part 41, the processing determining part 42 is brought into operation next. The processing determining part 42 analyzes the email EM2 thereby received (process P13). To be more specific, the processing determining part 42 determines whether or not the newly received email EM2 contains the instruction information D1 specifying the processing to process the previously received email EM1. The processing determining part 42 determines the processing should be performed to process the previous email EM1 in accordance with the instruction information D1 when the newly received email EM2 contains the instruction information D1 (process P14).

At time of analyzing the email EM2 on the image forming apparatus 2 (process P13), there may be multiple emails EM1 saved in the storage unit 27. For such cases, the processing determining part 42 compares identification information of the newly received email EM2 with identification information of the previous email EM1 already saved in the storage unit 27, thereby identifying the email EM1, the identification information of which matches that of the email EM2, as the target of the determined processing. The identification information to be used for comparison may be a source address of each email EM1 and EM2, for example.

When no email is identified as the email to be the target of the determined processing, the newly received email EM2 is processed as the new print job. In this case, the email EM2 is saved in the storage unit 27, and the process to produce the printed output is temporarily suspended until the time at which the predetermined period of time T has elapsed.

In response to successfully identifying the email EM1 to be the target of the determined processing, the processing determining part 42 determines the processing to be performed to process the email EM1 as described next. More specifically, when the previously received email EM2 having the same information in the subject line and text body as the email EM1 identified as the target of the determined processing, the processing determining part 42 determines the processing to delete the email EM1 saved in the storage unit 27. The processing determining part 42 determines the processing to delete the email EM1 in the storage unit 27 when the newly received email EM2 is the blank email as it does when receiving the same email EM2. On the other hand, when the newly received email EM2 contains the command to change the print settings for the email EM1 identified as the target of the determined processing, the processing determining part 42 determines the processing to change the print settings based on the contained command. Further, when the file attached to the newly received email EM2 is different from the one attached to the email EM1 identified as the target of the determined processing, the processing determining part 42 determines the processing to change the file to print. If none of the aforementioned cases applies to the newly received email EM2, the received email EM2 is processed as the new print job.

After the processing on the previous email EM1 is determined by the processing determining part 42, the email processing part 43 is brought into operation on the controller 10 next. The email processing part 43 performs the processing determined by the processing determining part 42 to process the previous email EM1 saved in the storage unit 27 (process P15). More specifically, the email processing part 43 performs the processing to delete the previous email EM1 saved in the storage unit 27, to change the print settings or to change the attachment file to print in response to determination by the processing determining part 42. The process P15 of FIG. 5 performed by the email processing part 43 is carried out during the temporary suspension before the predetermined period of time T has elapsed. However, this is one of the examples. The process P15 may be carried out soon after the temporary suspension is cancelled.

Figure 6:
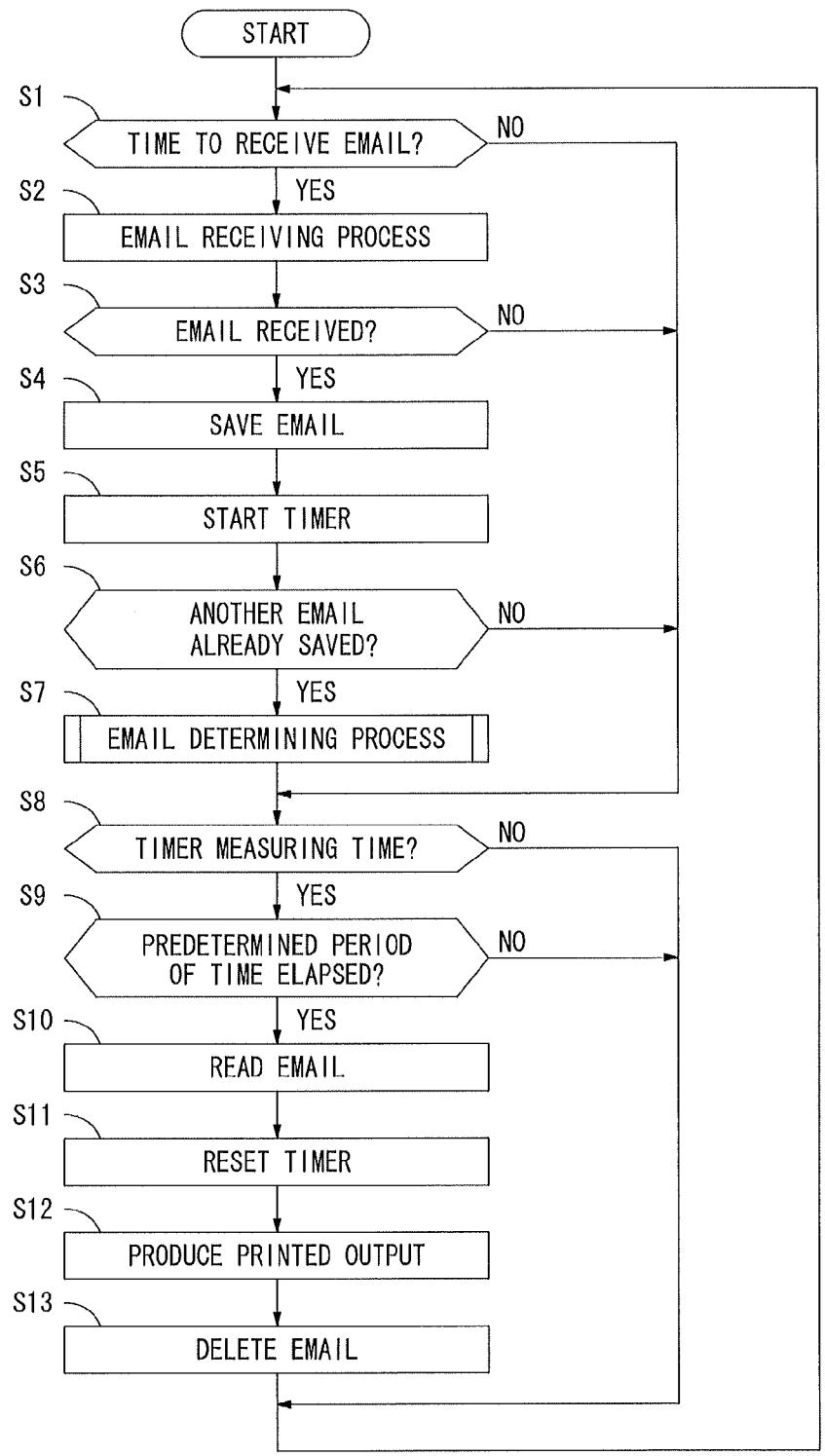
FIG. 6 is a flow diagram explaining an exemplary sequential procedure of the detailed process performed on the image forming apparatus of the first preferred embodiment.
Figure 7:
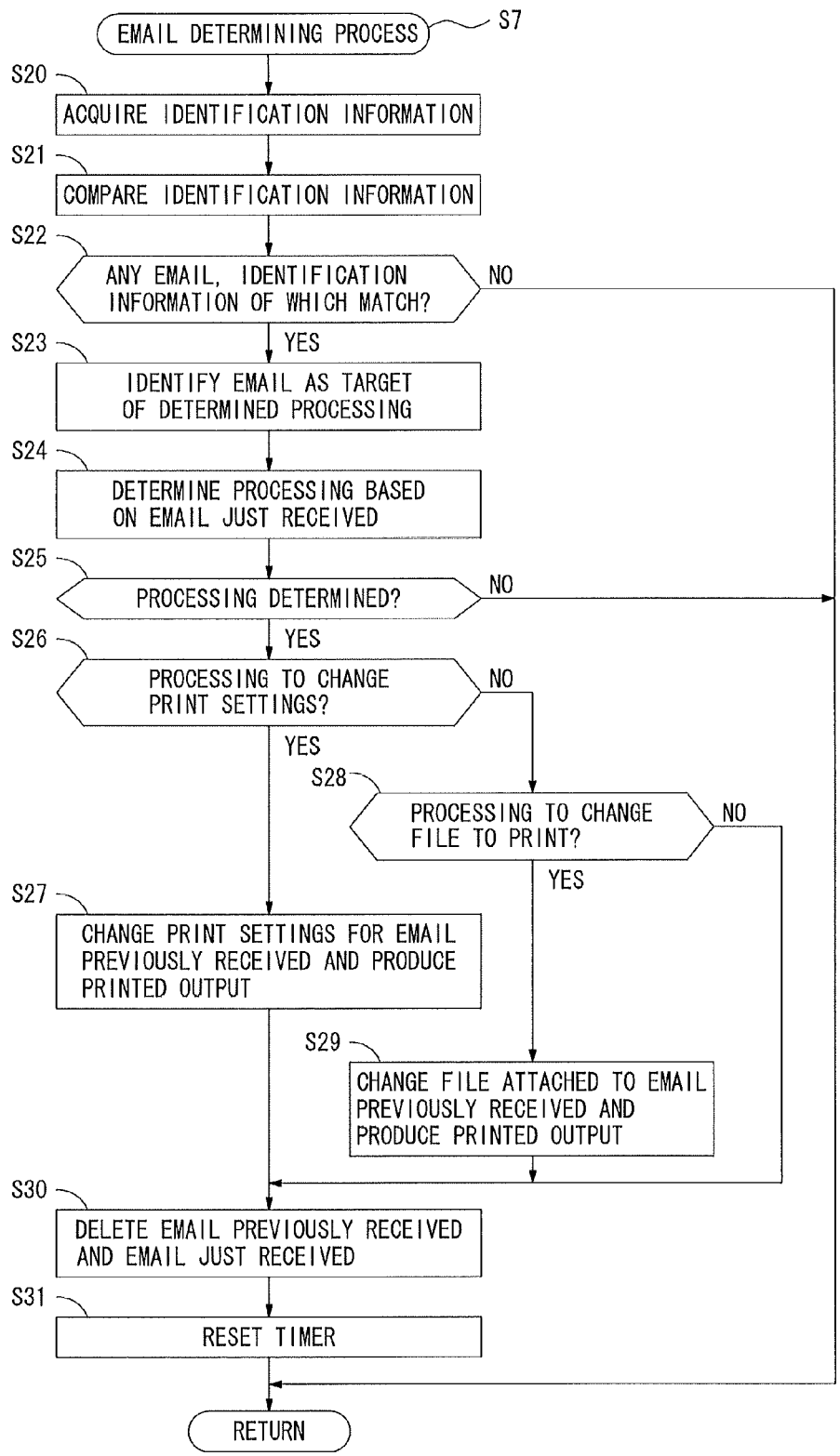
FIG. 7 is a flow diagram explaining the detailed exemplary sequential procedure of an email determining process in the first preferred embodiment.

The detailed operations on the image forming apparatus 2 of the first preferred embodiment is described next. FIGS. 6 and 7 are flow diagrams explaining exemplary sequential procedures of the process performed on the image forming apparatus 2 of the first preferred embodiment. After the image forming apparatus 2 of the first preferred embodiment is powered on, the program 14 is started up on the controller 10. The process explained in the flow diagram of FIG. 6 is then repeatedly performed.

In response to starting the process of FIG. 6, the controller 10 determines whether or not it is the time to receive the email (step S1). If it is the time to receive the email (when a result of step S1 is YES), the controller 10 brings the email receiving part 31 into operation to perform the email receiving process (step S2). After receiving the email through the email receiving process (when a result of step S3 is YES), the controller 10 brings the stop controlling part 41 into operation to save the received email (step S4). The controller 10 then starts the timer to measure the predetermined period of time T (step S5). Thus, the process to produce the printed output of the email received in step S2 is temporarily suspended.

The controller 10 brings the processing determining part 42 into operation next to determine whether or not there is another email already saved in the storage unit 27 (step S6). When it is determined that there is another previously saved email (when a result of step S6 is YES), the controller 10 performs the email determining process (step S7). In the email determining process (step S7), it is determined if the email received in step S2 contains the instruction information D1 specifying the processing on the previously saved email. If the email contains the instruction information D1, the processing to process the previous email is performed.

FIG. 7 is a flow diagram explaining the detailed exemplary sequential procedure of the email determining process (step S7). Upon start of the process of FIG. 7, the controller 10 acquires the source address of each of emails, the one just received and the one previously saved in the storage unit 27, as the identification information (step S20). The controller 10 compares the acquired identification information (step S21), and determines whether or not there is any previous email saved in the storage unit 27, the identification information of which matches the identification of the email just received (step S22). If there is no previous email saved in the storage unit 27, the identification information of which matches the identification information of the email just received (when a result of step S22 is NO), the email just received is considered as the new print job. The controller 10, therefore, completes the email determining process without carrying out later process.

If there is the previous email, the identification information of which matches the identification information of the email just received (when a result of step S22 is YES), the controller 10 identifies the detected email as the target of the determined processing (step S23). The controller 10 determines the processing to process the email identified as the target of the determined processing based on the email just received (step S24). In some cases, however, the processing may not be allowed to be determined in step S24. The controller 10, therefore, determines whether or not the processing to process the email identified as the target of the determined processing is successfully determined (step S25). In cases where the processing is not determined (when a result of step S25 is NO), the email just received is considered as the new print job. The controller 10 then completes the email determining process without carrying out the later process.

When the processing to process the previous email may be determined (when a result of step S25 is YES), the controller 10 brings the email processing part 43 into operation to perform the determined processing and moves on to step S26. In this case, the controller 10 determines if the determined processing to process the previous email is to change the print settings (step S26). When the determined processing is to change the print settings, the controller 10 changes the print settings for the email previously received and outputs to the printer section 25, thereby causing the printer section 25 to produce the printed output based on the updated print settings (step S27). When the determined processing is not to change the print settings (when a result of step S26 is NO), the controller 10 determines if the processing is to change the file to print (step S28). In response to determining that the processing is to change the file to print, the controller 10 changes the file attached to the email previously received to the one attached to the email just received and outputs to the printer section 25, thereby causing the printer section 25 to produce the printed output of the updated file (step S29). If the determined processing is not even to change the file to print (when a result of step S28 is NO), the controller 10 moves on to step S30 to delete both of the emails, the one previously received and saved in the storage unit 27 and the one just received, from the storage unit 27 (step S30). The controller 10 also stops the timer measuring the time from the times of saving the email previously received and of saving the email just received, and resets the measured time (step S31). The whole process of the email determining process is complete.

Referring back to the flow diagram in FIG. 6. The process in steps S1 to S7 as described above is performed at the time to receive the email. When the result of step S1, S3 or S6 is NO, however, the later process is skipped.

The controller 10 moves on to step S8 to determine whether or not the timer is measuring the time (step S8). When the timer is measuring the time, the controller 10 reads the time measured by the timer and determines if the predetermined period of time T has elapsed (step S9). As the predetermined period of time T has elapsed (when a result of step S9 is YES), the controller 10 reads the email which is saved in the storage unit 27 from the time at which the timer is started (step S10), and resets the measured time of the timer (step S11). The controller 10 outputs the print job based on the email read from the storage unit 27 to the printer section 25 to cause the printer section 25 to produce the printed output (step S12). The controller 10 then deletes the email saved in the storage unit 27 (step S13). When the timer is not measuring the time in step S8, or the predetermined period of time T has not elapsed in step S9, the process in steps S10 to S13 is skipped.

The process as described above is performed on the image forming apparatus 2 so that the wrong email EM1 sent by the user by mistake is not printed as it is if the email EM2 containing the instruction information D1 is again sent by the user relatively early. The user may send the wrong email EM1 by mistake to the image forming apparatus 2 from outside the office, for example. Even in such a case, the user again sends the email EM2 containing the instruction information D1 immediately so that he or she is allowed to cancel the print job based on the email EM1 previously sent, to make change in the print settings to output, or to change the file to print.

As described above, the stop controlling part 41 of the first preferred embodiment temporarily suspends the process to produce the printed output until the time at which the predetermined period of time T has elapsed by saving the email EM1 received by the email receiving part 31 in the storage unit 27. The email receiving part 31 may receive the email EM2 containing the instruction information D1 before the predetermined period of time T has elapsed. In this case, the process determining part 42 determines the processing to process the email EM1 saved in the storage unit 27 in accordance with the instruction information D1, and the email processing part 43 performs the determined processing to process the email EM1. The user using the terminal device 3 may send the wrong email EM1 by mistake to the image forming apparatus 2, for example. Even in such a case, the user again sends the email EM2 containing the instruction information D1 immediately so that he or she is allowed to cancel the printing based on the email EM1 previously sent, for example, resulting in less frequency of miss prints.

Second Preferred Embodiment

The second preferred embodiment is explained next. It is assumed that the user who is relatively close to the image forming apparatus 2 sends the wrong email by mistake from the terminal device 3 to the image forming apparatus 2. In such a case, according to the second preferred embodiment, the user operates the operational panel 20 of the image forming apparatus 2 to input the instruction information, thereby causing the image forming apparatus 2 to perform the processing in accordance with the instruction information to process the received email. In order to realize this, the image forming apparatus 2 of the second preferred embodiment includes the operational panel 20 on which a stop key to force the email receiving process or the process to produce the printed output based on the received email performed on the image forming apparatus 2 to temporarily suspend is arranged.

Figure 8:
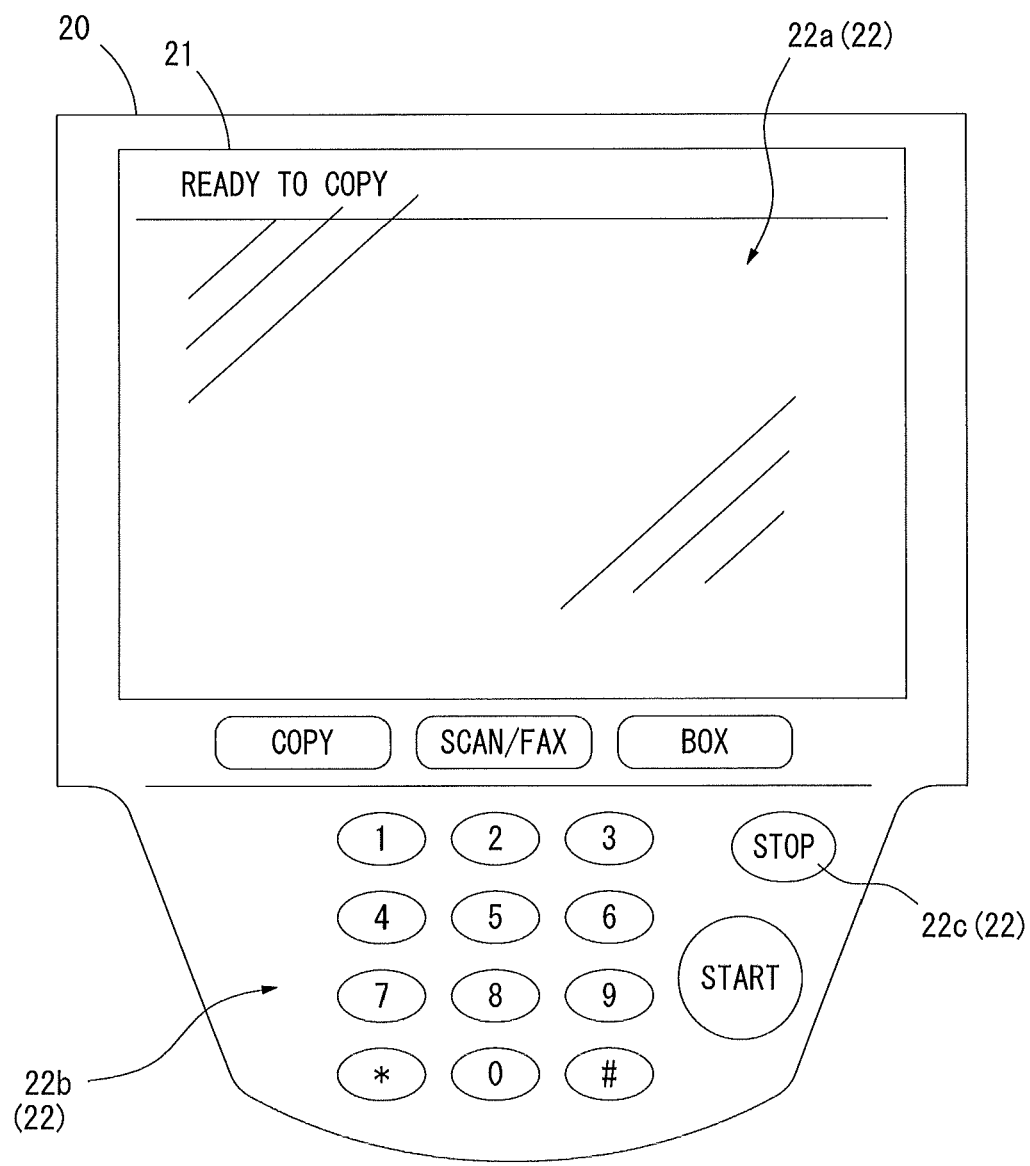
FIG. 8 shows an exemplary front view of an operational panel of a second preferred embodiment.

FIG. 8 shows an exemplary front view of the operational panel 20 of the second preferred embodiment. The manipulation unit 22 receiving inputs of a variety of instructions by the user of the operational panel 20 is formed with parts including touch panel keys 22a arranged on the viewing area of the display unit 21 and multiple push-button keys 22b arranged around the display unit 21. A stop key 22c is arranged on the operational panel 20 as one of the arranged multiple push-button keys 22b. It is assumed that the user noticed that he or she has sent the wrong email EM1 to the image forming apparatus 2 by mistake from the terminal device 3. In such a case, the stop key 22c is pressed by the user to temporarily suspend the process on the wrong email sent by mistake. The image forming apparatus 2 of the second preferred embodiment detects that the stop key 22c arranged on the operational panel 20 is pressed by the user. The stop controlling part 41 is then brought into operation to temporarily suspend the email receiving process by the email receiving part 31 and the process to produce the printed output by the print controlling part 32.

Figure 9:
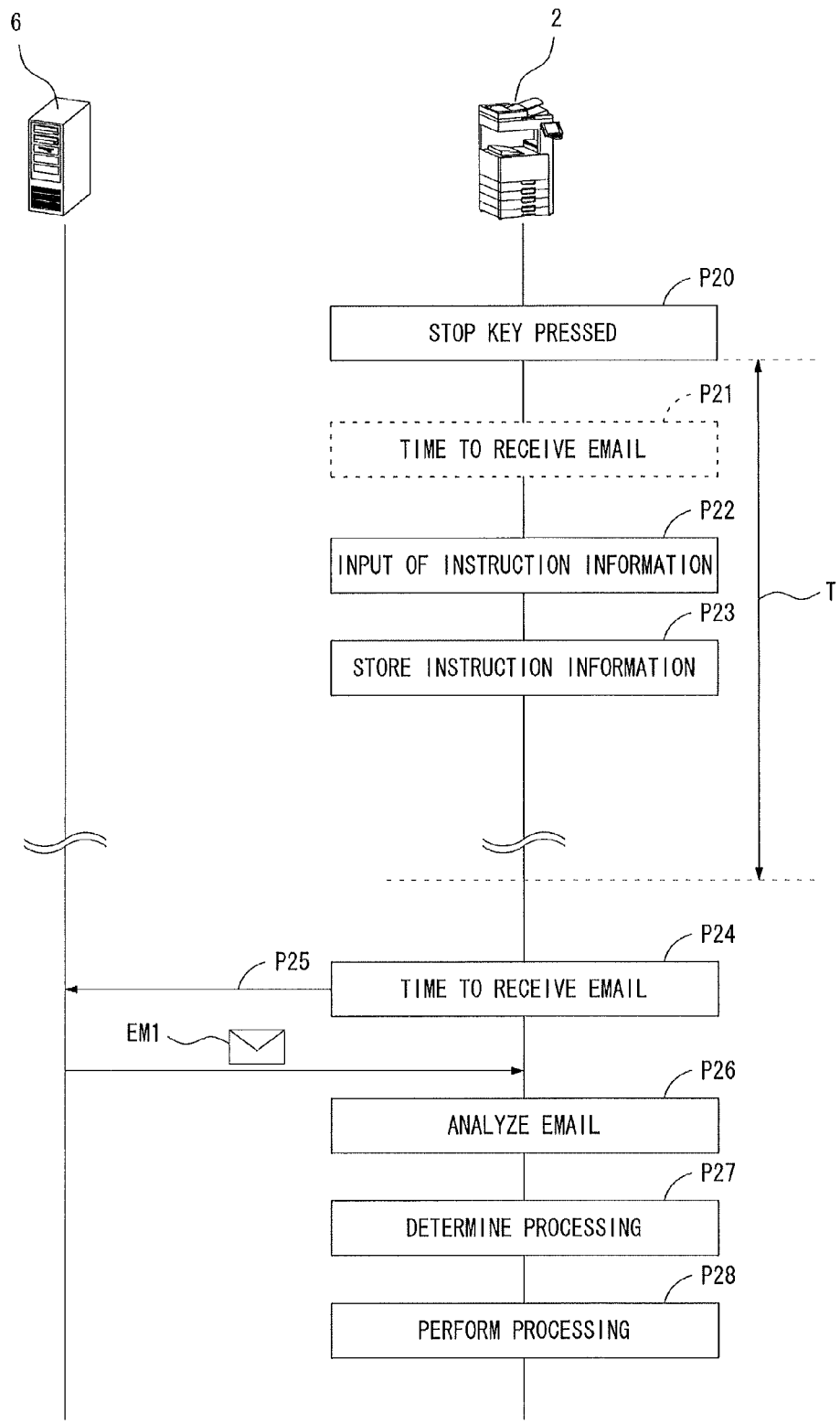
FIG. 9 is a flow diagram explaining an exemplary sequential procedure to cancel producing the printed output or to make change in the settings by activating email print function in the second preferred embodiment.

FIG. 9 is a flow diagram explaining an exemplary sequential procedure to cancel producing the printed output or to make change in the settings on the image forming apparatus 2 by activating email print function. The exemplary sequential procedure of FIG. 9 characterizes the second preferred embodiment. In response to detecting that the stop key 22c is pressed by the user (process P20), the image forming apparatus 2 brings the stop controlling part 41 into operation on the controller 10 to activate the timer to start measuring the time. The stop controlling part 41 also controls not to perform the email receiving process until the time at which the predetermined period of time T has elapsed. The image forming apparatus 2 may detect that the time to receive the email has arrived before the predetermined period of time T has elapsed (process P21). Even in such a case, the image forming apparatus 2 does not access the POP server 6. As a result, the email EM1 sent by the user by mistake to the image forming apparatus 2 is not received by the image forming apparatus 2 at least until the time at which the predetermined period of time T has elapsed.

The image forming apparatus 2 brings the processing determining part 42 into operation during the temporary suspension. The processing determining part 42 receives the instruction information input by the user through the operational panel 20 (process P22). After receiving the instruction information input by the user, the processing determining part 42 temporarily stores the received instruction information in the storage unit such as the RAM 12 (process P23). The user operates the operational panel 20 before the email EM1 sent by mistake is received so that he or she is allowed to set the instruction information specifying the processing that should be carried out in response to receiving the email EM1. The processing that may be set as the instruction information input by the user through the operational panel 20 includes deletion of the email or making change in print settings, for example.

The temporary suspension by the stop controlling part 41 is then cancelled, and the image forming apparatus 2 detects that the time to receive the email has arrived (process P24). The email receiving part 31 performs the email receiving process (process P25). This time, the image forming apparatus 2 receives the email EM1 sent by the user by mistake. After the email EM1 is received by the email receiving part 31, the processing determining part 42 is brought into operation on the controller 10. The processing determining part 42 analyzes the received email EM1 (process P26). To be more specific, the processing determining part 42 determines whether or not the received email EM1 corresponds to the instruction information set in advance. When the email EM1 corresponds to the instruction information, the processing determining part 42 determines the processing should be performed to process the received email EM1 in accordance with the instruction information (process P27).

The multiple emails EM1 may be received by the image forming apparatus 2 in process P25. For such cases, the processing determining part 42 compares each of the source addresses of the multiple emails EM1 with a source address contained in the instruction information set in advance, and identifies the email EM1, the source address of which matches the source address in the set instruction information, as the target of the determined processing. The processing determining part 42 determines the processing should be performed to process the identified email.

In cases where the email to be the target of the determined processing is not identified, the email EM1 received in the process P25 is considered as a normal print job. The print controlling part 32 is brought into operation to produce the printed output based on the received email EM1.

After the processing to process the email EM1 is determined by the processing determining part 42, the controller 10 brings the email processing part 43 into operation. The email processing part 43 performs the processing determined by the processing determining part 42 to process the email EM1 received in the process P25 (process P28). More specifically, the email processing part 43 performs the processing to delete the received email EM1 or to change the print settings for the received email EM1 in response to determination by the processing determining part 42.

Figure 10:
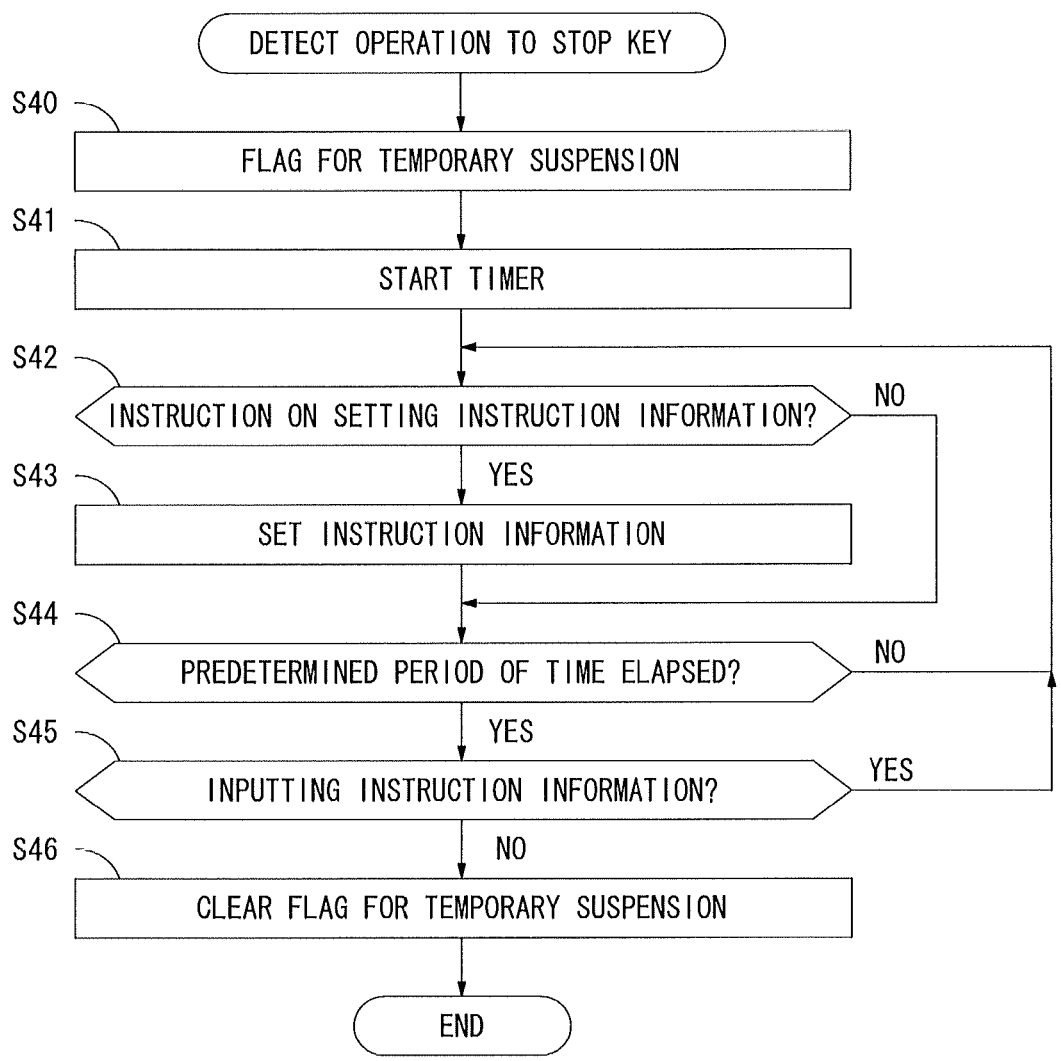
FIG. 10 is a flow diagram explaining an exemplary sequential procedure of the process performed as an interrupt processing on the image forming apparatus in response to detecting that a stop key is pressed.

The detailed sequential procedure on the image forming apparatus 2 of the second preferred embodiment is described next. FIG. 10 is a flow diagram explaining an exemplary sequential procedure of the process performed as an interrupt processing on the image forming apparatus 2 in response to detecting that the stop key 22c of the operational panel 20 is pressed. The process explained in the flow diagram of FIG. 10 is carried out on the controller 10 in parallel with the process in accordance with a flow diagram of FIG. 15 described later.

As shown in FIG. 10, in response to detecting the stop key 22c of the operational panel 20 is pressed, the stop controlling part 41 is brought into operation on the controller 10 to flag a predetermined region of the RAM 12 for temporary suspension (step S40). With flagging, the stop controlling part 41 starts the timer to measure the predetermined period of time T (step S41). When the user operates the operational panel 20 to input the instruction information and to set the input instruction information (step S42), the processing determining part 42 sets the input instruction information (step S43).

It is determined whether or not the timer started in step S41 has measured the predetermined period of time (step S44). When the predetermined period of time has not elapsed from the starting time, the controller 10 returns to step S42. As the predetermined period of time has elapsed (when a result of step S44 is YES), the controller 10 determines if the user is inputting the instruction information (step S45). The user may be inputting the instruction information (when a result of step S45 is YES). In this case, the controller 10 returns to the step S42 to repeatedly perform the above-described process until the user completes inputting. After the user completes inputting (when a result of step S45 is NO), the stop controlling part 41 clears the flag for temporary suspension (step S46), and completes the series of process performed when the stop key 22c is pressed by the user. According to the second preferred embodiment, while the instruction information is being input by the user, it is configured not to clear the flag for temporary suspension until the input is complete.

The user may send the wrong email EM1 by mistake to the image forming apparatus 2. In such a case, he or she is allowed to flag in the image forming apparatus 2 for temporary suspension by pressing the stop key 22c of the operational panel 20. The user operates the operational panel 20 with flagging for temporary suspension so that he or she is allowed to input the instruction information specifying the processing to process the email EM1 sent by mistake. The user inputs any of the information, the source address of the email EM1, the subject title or the name of the attachment file, for example, as the identification information for identifying the email EM1 sent by mistake.

Figure 11:
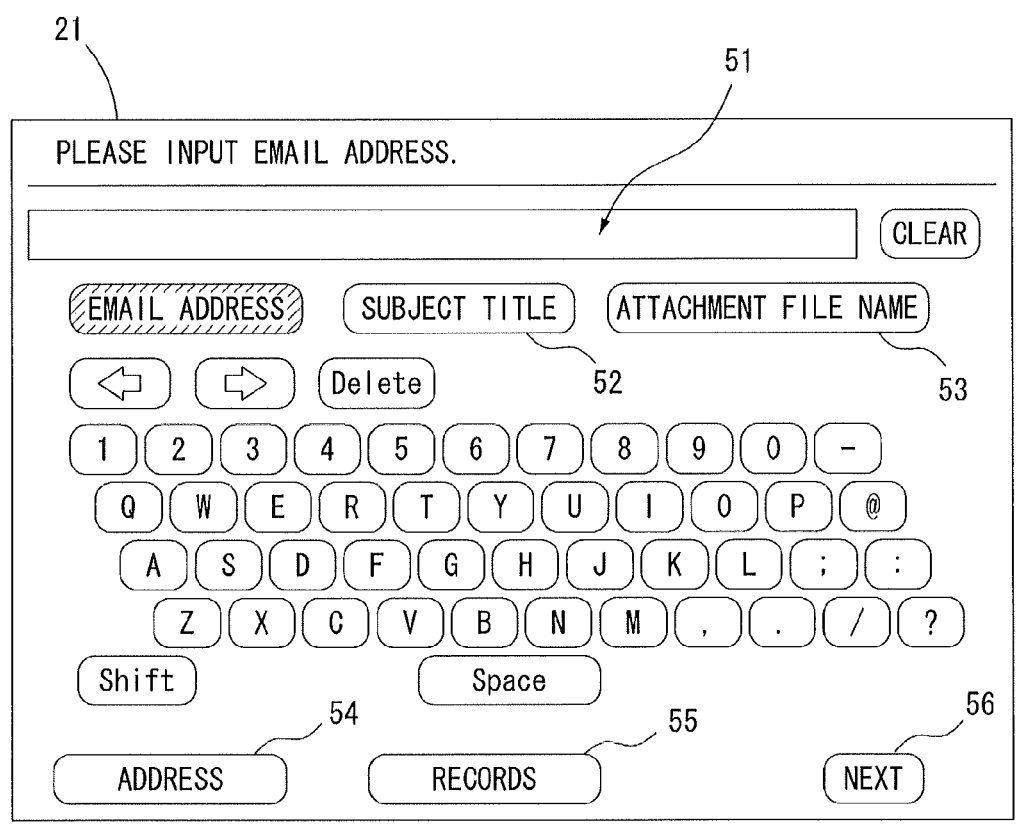
FIG. 11 is an example of a screen image displayed on a viewing area of a display unit of the operational panel when a user inputs identification information.

FIG. 11 is an example of a screen image displayed on the viewing area of the display unit 21 of the operational panel 20 when the user inputs the identification information. As illustrated in FIG. 11, multiple operation keys are shown to be keyboard keys on the display unit 21. The user taps the multiple operation keys, thereby inputting the identification information one character after another in an identification information field 51. In the example of FIG. 11, an email address indicating the source address of the email EM1 is inputted as the identification information. For inputting the subject title of the email EM1 as the identification information, the user taps a subject title key 52 to switch the screen image for inputting the subject title of the email EM1 as the identification information. For inputting the name of the file attached to the email EM1 as the identification information, the user taps an attachment file name key 53 to switch the screen image for inputting the attachment file name contained in the email EM1 as the identification information.

The user may feel bothersome to tap each operation key laid out in a manner of the keyboard one by one to input the source address of the email EM1 as the identification information on the screen image illustrated in FIG. 11, and this may cause typing error. The user is allowed to select and input the source address of the email EM1 relatively easy by tapping an address key 54 or a records key 55 as illustrated in FIG. 11.

Figure 12:
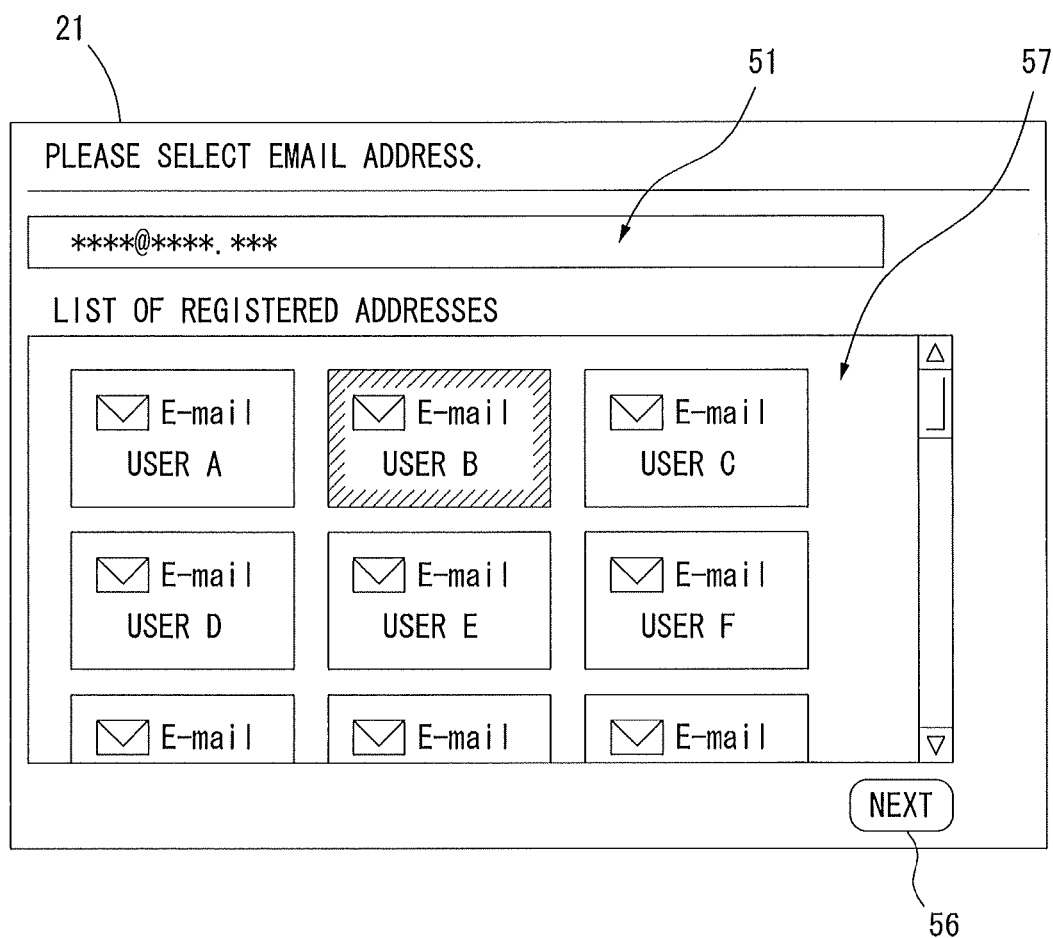
FIG. 12 is an example of a screen image displayed on the viewing area of the display unit when the user taps an address key.

FIG. 12 is an example of a screen image displayed on the viewing area of the display unit 21 when the user taps the address key 54. The image forming apparatus 2 supports email transmission function to send an email containing an attachment file of image data generated by the scanner section 24 by reading a document, for example, and the email address that may be designated as the recipient for transmitting the email is registered in advance with the image forming apparatus 2. As the address key 54 is tapped by the user, a list of the email addresses registered in advance with the image forming apparatus 2 is shown on the viewing area of the display unit 21 of the operational panel 20 as illustrated in FIG. 12. The user is allowed to designate the source address as the identification information of the email EM1 relatively easy by selecting the source address of the email EM1 sent by mistake from the list. In this case, the typing error may be avoided.

Figure 13:
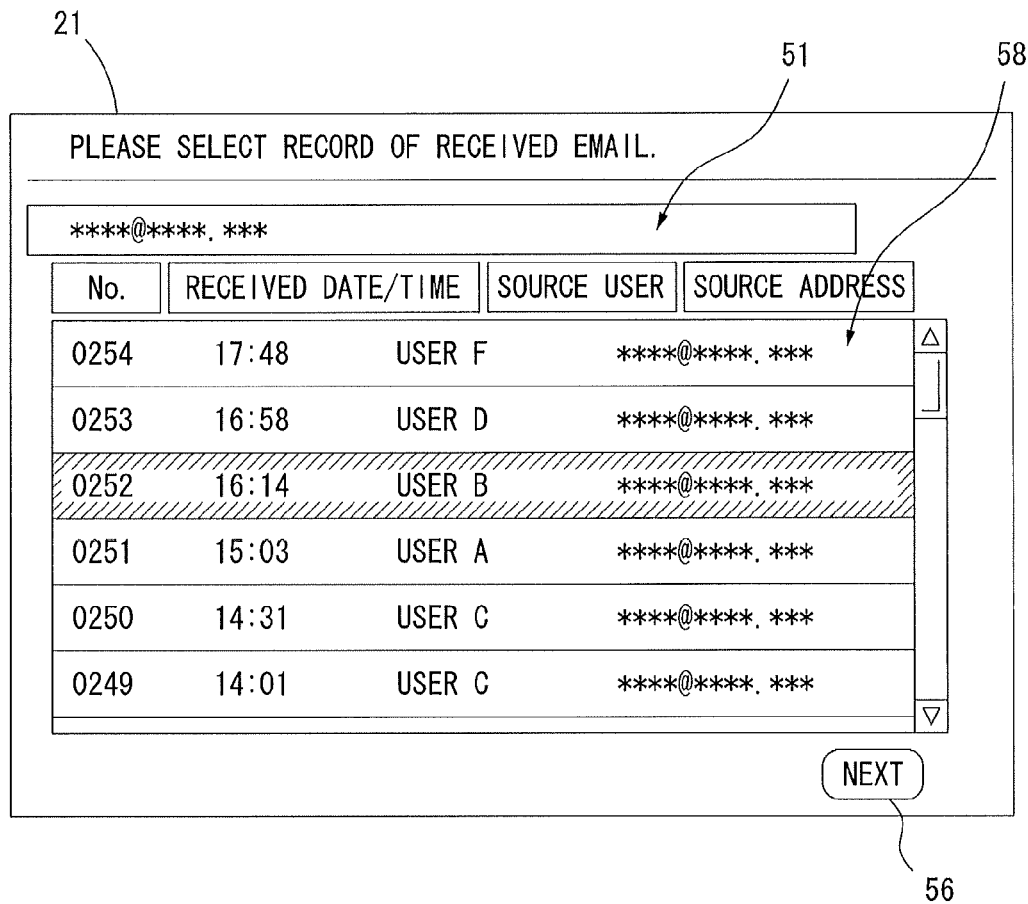
FIG. 13 is an example of a screen image displayed on the viewing area of the display unit when the user taps a records key.

FIG. 13 is an example of a screen image displayed on the viewing area of the display unit 21 when the user taps the records key 55. The image forming apparatus 2 saves email records of received emails as records information every time receiving the email. The source address of the received email is also saved as the records information. As the records key 55 is tapped by the user, a list of all the received emails is shown on the viewing area of the display unit 21 of the operational panel 20 as illustrated in FIG. 13 by reading the records information saved in the image forming apparatus 2. The user is allowed to designate the source address as the identification information of the email EM1 relatively easy by selecting the source address of the email received in the past from the list. Also in this case, the typing error for the source address may be avoided.

Figure 14:
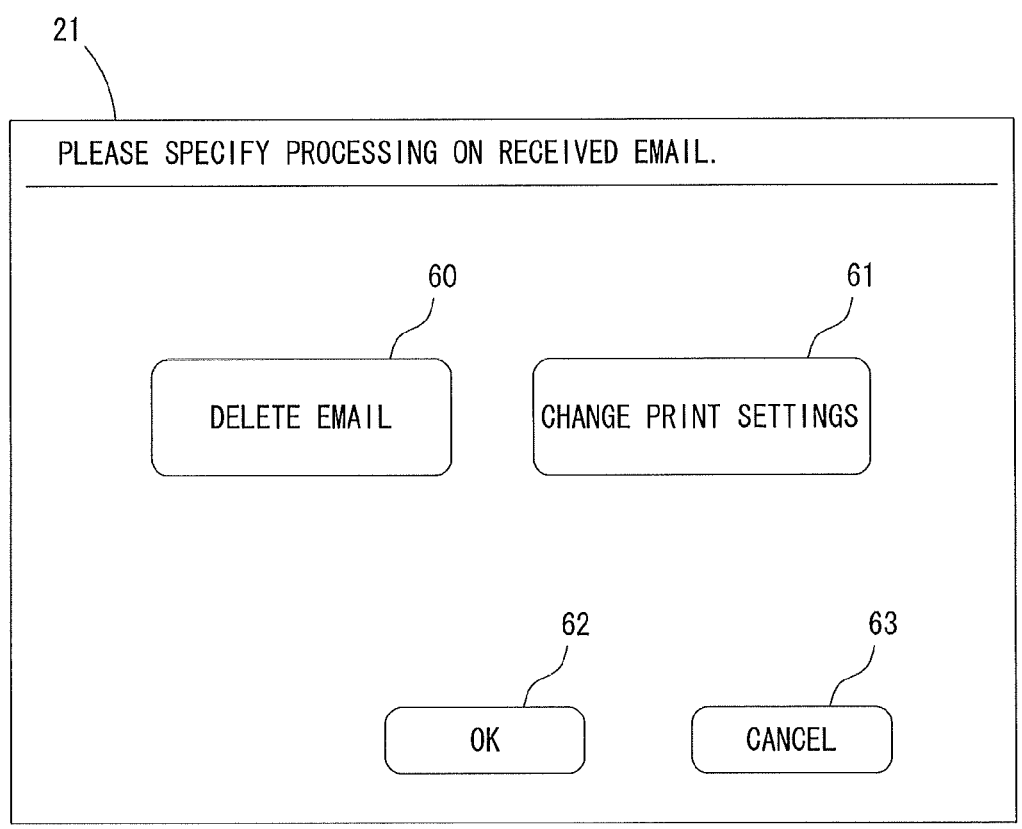
FIG. 14 is an example of a screen image for specifying a processing to process an email.

The user finishes inputting the identification information on the screen image shown in FIG. 11, 12 or 13. The user then taps a "next" key 56 to update the screen image to the one for specifying the processing to process the email EM1 sent by mistake. FIG. 14 is an example of a screen image for specifying the processing to process the email EM1. As the screen image illustrated in FIG. 14 is shown, the user taps either an email delete key 60 or a print settings change key 61. In response to tapping either key, the user is allowed to delete the email EM1 or to make change in the print settings for printing based on the email EM1 as the processing to process the email EM1 sent by mistake. When the user taps the print settings change key 61, another screen image for making change in the print settings is shown, and he or she is allowed to configure print settings as he or she desires on the shown screen image.

In order to complete the input operation of the identification information, the user taps either an OK key 62 or a cancel key 63 on the screen image of FIG. 14. As the OK key 62 is tapped, the image forming apparatus 2 saves the identification information input by the user in the storage unit such as the RAM 12. As the cancel key 63 is tapped, the image forming apparatus 2 completes the process to receive the input by the user without saving the identification information. After the OK key 62 or the cancel key 63 is tapped by the user, the aforementioned flag for temporary suspension is cleared.

Figure 15:
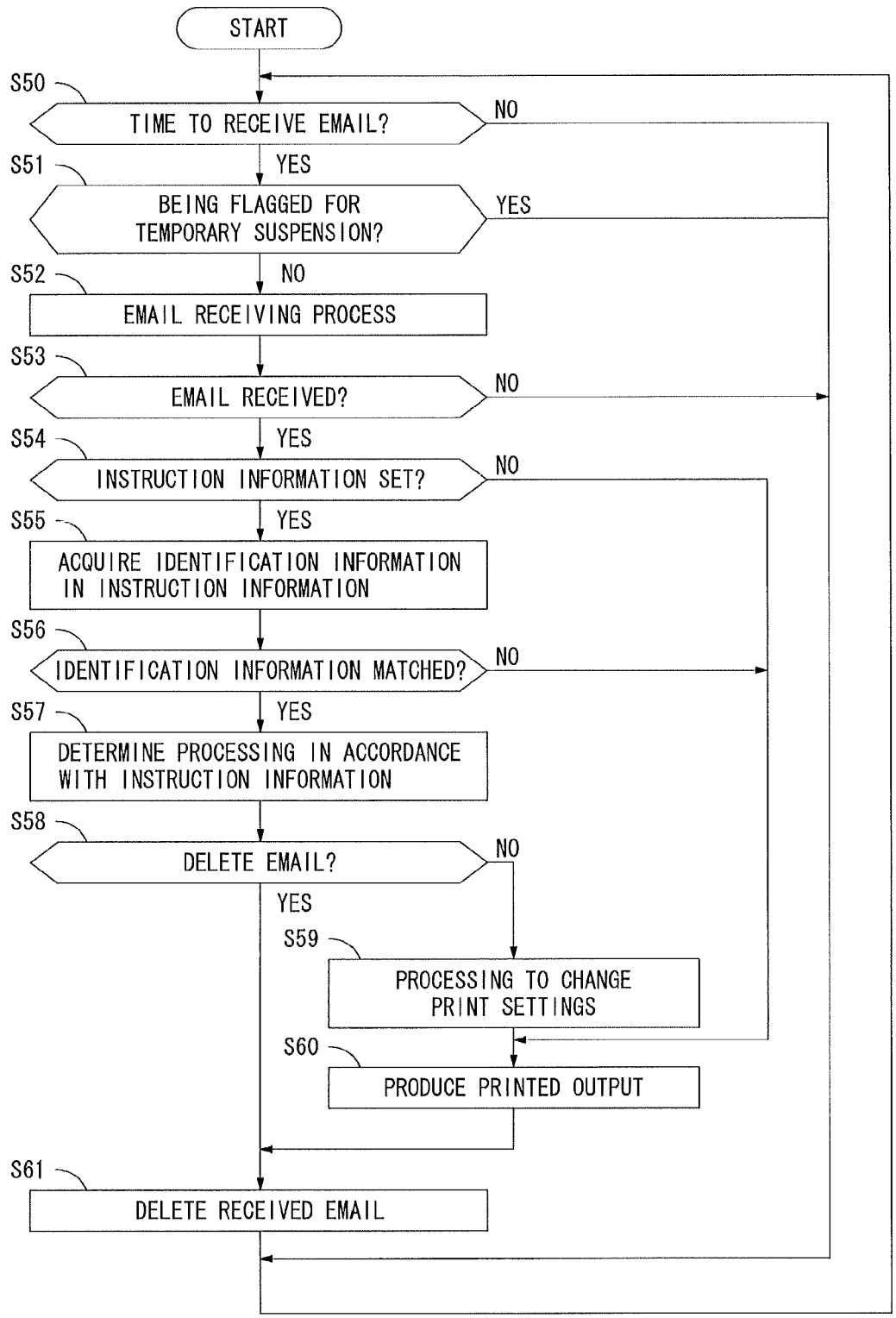
FIG. 15 is a flow diagram explaining an exemplary sequential procedure of the process repeatedly performed on the image forming apparatus of the second preferred embodiment.

FIG. 15 is a flow diagram explaining an exemplary sequential procedure of the process repeatedly performed on the image forming apparatus 2 of the second preferred embodiment. After the image forming apparatus 2 is powered on, the process is repeatedly performed on the controller 10. The process already explained in the flow diagram of FIG. 10 is performed in parallel with the process based on the flow diagram of FIG. 15.

In response to starting the process of FIG. 15, the controller 10 determines whether or not it is the time to receive the email (step S50). If it is not the time to receive the email, the controller 10 skips the process in steps S51 to 61. If it is the time to receive the email (when a result of step S50 is YES), the controller 10 determines if it is flagged for the temporary suspension (step S51). When it is flagged for the temporary suspension (when a result of step S51 is YES), the controller 10 skips the process in steps S52 to 61. So, when it is flagged for the temporary suspension through the process in FIG. 10, it comes to the time to receive the email, the email receiving process is not performed.

When it is not flagged for the temporary suspension (when a result of step S51 is NO), the email receiving part 31 is brought into operation on the controller 10 to perform the email receiving process (step S52). After receiving the email through the email receiving process (when a result of step S53 is YES), the controller 10 moves on to step S54. Without receiving the email (when a result of step S53 is NO), the controller 10 skips the process in steps S54 to 61.

In response to receiving the email (when a result of step S53 is YES), the controller 10 determines whether or not the instruction information input by the user is set (step S54). When the instruction information is not set (when a result of step S54 is NO), the controller 10 moves on to step S60 to produce the printed output based on the email received in step S52 (step S60). After the printed output is produced, the controller 10 deletes the received email and completes the whole process (step S61).

There may be the instruction information set when the email is received (when a result of step S54 is YES). In this case, the controller 10 acquires the identification information contained in the set instruction information (step S55), and determines whether or not the acquired identification information matches the identification information of the email received in step S52 (step S56). If it is not considered as a match (when a result of step S56 is NO), the controller 10 moves on to step S60 to produce the printed output based on the email received in step S52 (step S60). After the printed output is produced, the controller 10 deletes the received email and completes the whole process (step S61).

When the identification information of the email received in step S52 matches the identification information contained in the instruction information (when a result of step S56 is YES), the processing determining part 42 on the controller 10 determines the processing to process the received email in accordance with the instruction information (step S57). The email processing part 43 is brought into operation next. The processing determined by the processing determining part 42 may be deletion of the email (when a result of step S58 is YES). In this case, the email processing part 43 deletes the email received in step S52 and completes the whole process (step S61).

The processing determined by the processing determining part 42 may be the one other than deletion of the email (when a result of step S58 is NO). In such a case, the determined processing is considered to be the one to make change in the print settings. The email processing part 43 performs the processing to make change in the print settings for the email received in step S52 (step S59). The controller 10 applies the updated print settings to produce the printed output based on the email received in step S52 (step S60). The controller 10 then deletes the received email and completes the whole process (step S61).

The user may send the wrong email EM1 by mistake. Even in such a case, the user inputs the instruction information after pressing the stop key 22c on the operational panel 20 relatively early, and the above-described process performed on the image processing apparatus 2 allows preventing the email EM1 from being produced as the printed output as it is on the image forming apparatus 2. It is assumed, for example, that the user sends the wrong email EM1 from a place relatively close to the image forming apparatus 2. In this case, the user operates the operational panel 20 of the image forming apparatus 2 soon after he or she notices the mistake so that he or she is allowed to cancel the printing or to print after making change in the print settings before the image forming apparatus 2 receives the email EM1.

As described above, according to the second preferred embodiment, the stop controlling part 41 temporarily suspends the email receiving process and the process to produce the printed output based on the received email when the predetermined input received through the manipulation unit 22 of the operational panel 20 is detected. The processing determining part 42 receives input of the instruction information for the email EM1 received by the email receiving part 31 through the manipulation unit 22 while the stop controlling part 41 temporarily suspending the aforementioned processes. The processing determining part 42 then determines the processing to process the email EM1 received by the email receiving part 31 in accordance with the instruction information. Therefore, when the user using the terminal device 3 sends the wrong email EM1 by mistake to the image forming apparatus 2, he or she immediately makes the predetermined operation on the manipulation unit 22 of the operational panel 20 and inputs the instruction information after making the predetermined operation so that he or she is allowed to cancel the printing based on the sent email EM1, for example. This results in less frequency of miss prints.

Figure 16:
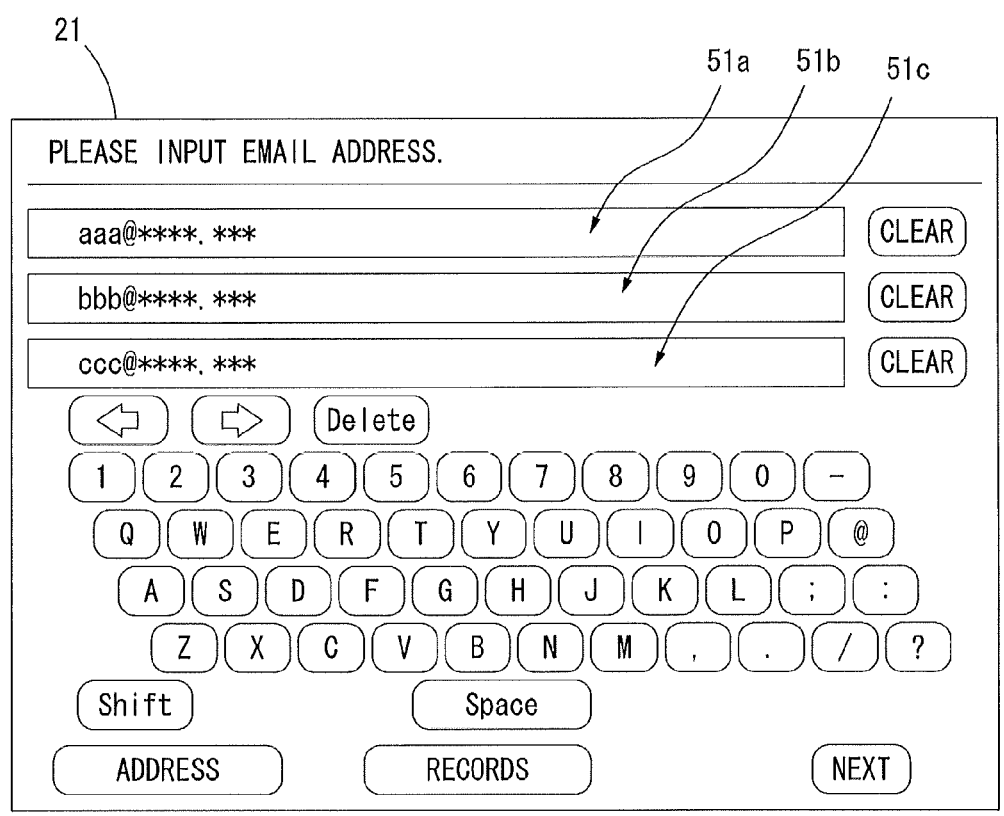
FIG. 16 is an example of a screen image that allows the multiple users to input the identification information at the same time.

In the second preferred embodiment, in response to sending the wrong email EM1 by mistake, the user is required to make the operation on the operational panel 20 of the image forming apparatus 2. The multiple users may send emails by mistake almost at the same time. The image forming apparatus 2 of the second preferred embodiment is preferably configured to control frequency of miss prints also in such a case. FIG. 16 shows an example of ways to control frequency of miss prints. FIG. 16 is an example of a screen image that allows the multiple users to input the identification information at the same time. As the stop key 22c is pressed by one of the multiple users, the screen image as illustrated in FIG. 16 is shown on the viewing area of the display unit 21 of the operational panel 20. The screen image contains multiple identification information fields 51a, 51b and 51c. Each user inputs the information such as the source address of the email he or she sent by mistake in the corresponding field of the multiple identification information fields 51a, 51b and 51c. Thus, the users are allowed to cancel the printings based on the respective emails at the same time. As described above, the second preferred embodiment preferably allows the plurality of identification information used by the processing determining part 42 to identify the multiple emails as the target of the determined processing to be inputted at the same time through the manipulation unit 22 of the operational panel 20. In the example of FIG. 16, the source address is inputted as the identification information. The subtitle of the email or the attachment file name may be inputted instead of the source address.

In the example described above, the identification information is input by the user who sent the email by mistake by manual. The conventional image forming apparatuses support user authentication function to authenticate the user who operates the operational panel 20. The image forming apparatuses are capable of automatically obtaining an email address of the user identified by the user authentication function. In the second preferred embodiment, the email address obtained by the user authentication function may be automatically acquired as the identification information.

Figure 17:
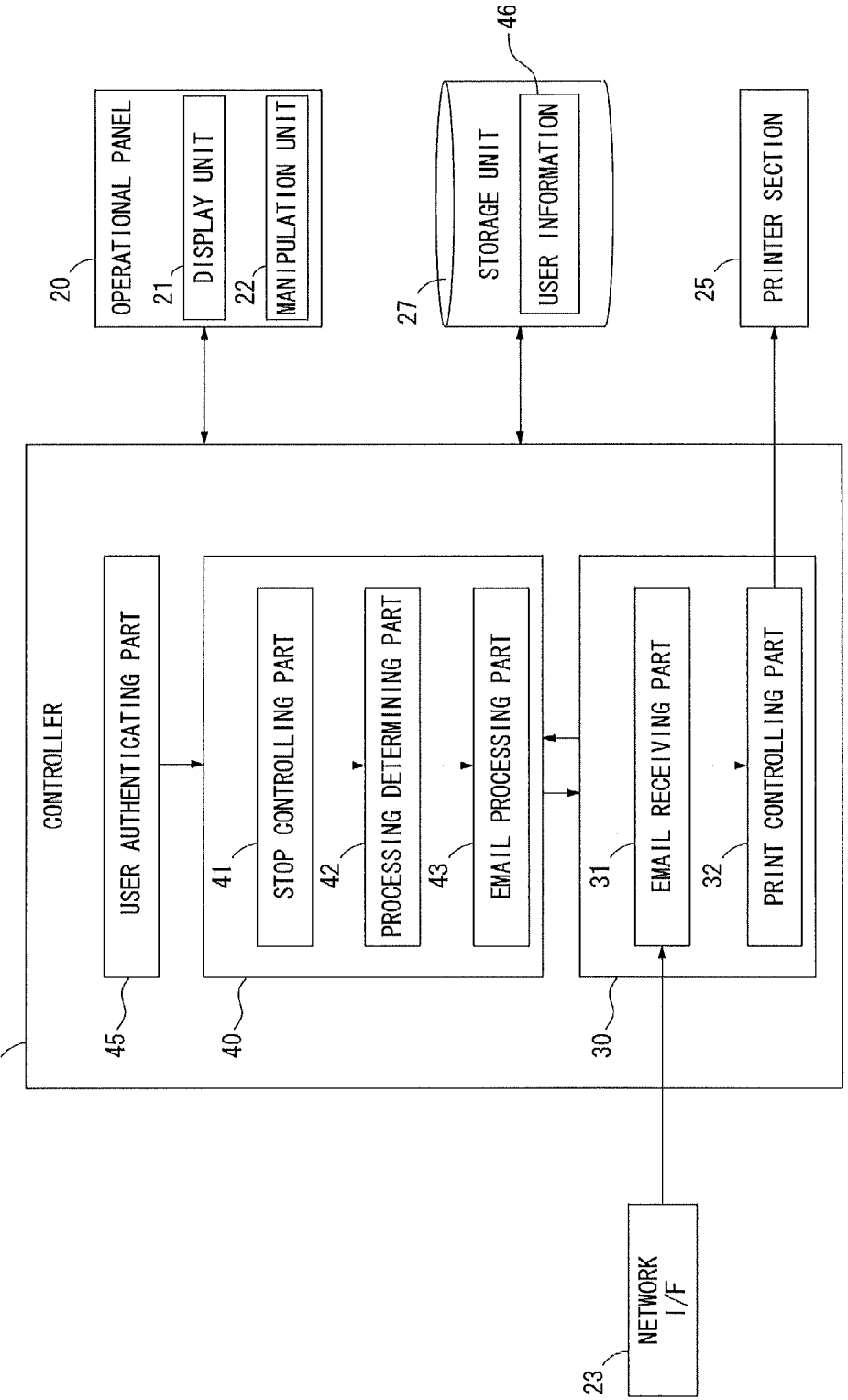
FIG. 17 is a block diagram showing an exemplary functional configuration of the controller including user authentication function.

FIG. 17 is a block diagram showing an exemplary functional configuration of the controller 10 including the user authentication function. What is different from the one in FIG. 3 is that the controller 10 shown in FIG. 17 serves as a user authenticating part 45. The user authenticating part 45 reads user information from an IC card, for example, carried by each user and authenticates the user. The user authenticating part 45 may perform biometric authentication by reading a finger print pattern or a vein pattern of the user, for instance. As the stop key 22c is pressed by the user, the user authenticating part 45 starts user authentication. In response to successfully identifying the user as a result of the authentication, the user authenticating part 45 automatically obtains the email address corresponding to the identified user registered in advance as the identification information, and outputs the identification information to the control functioning part 40. Thus, the processing determining part 42 is allowed to acquire the identification information for identifying the email EM1 from the user authenticating part 45. As a result, the user is not required to input the identification information on the operational panel 20 by manual, resulting in enhanced operability.

Third Preferred Embodiment

The third preferred embodiment is explained next. In the above-described second preferred embodiment, the email receiving process and the process to produce the printed output are temporarily suspended as the stop key 22c is pressed by the user. In the third preferred embodiment, only the process to produce the printed output is temporarily suspended as the stop key 22c is pressed by the user.

Figure 18:
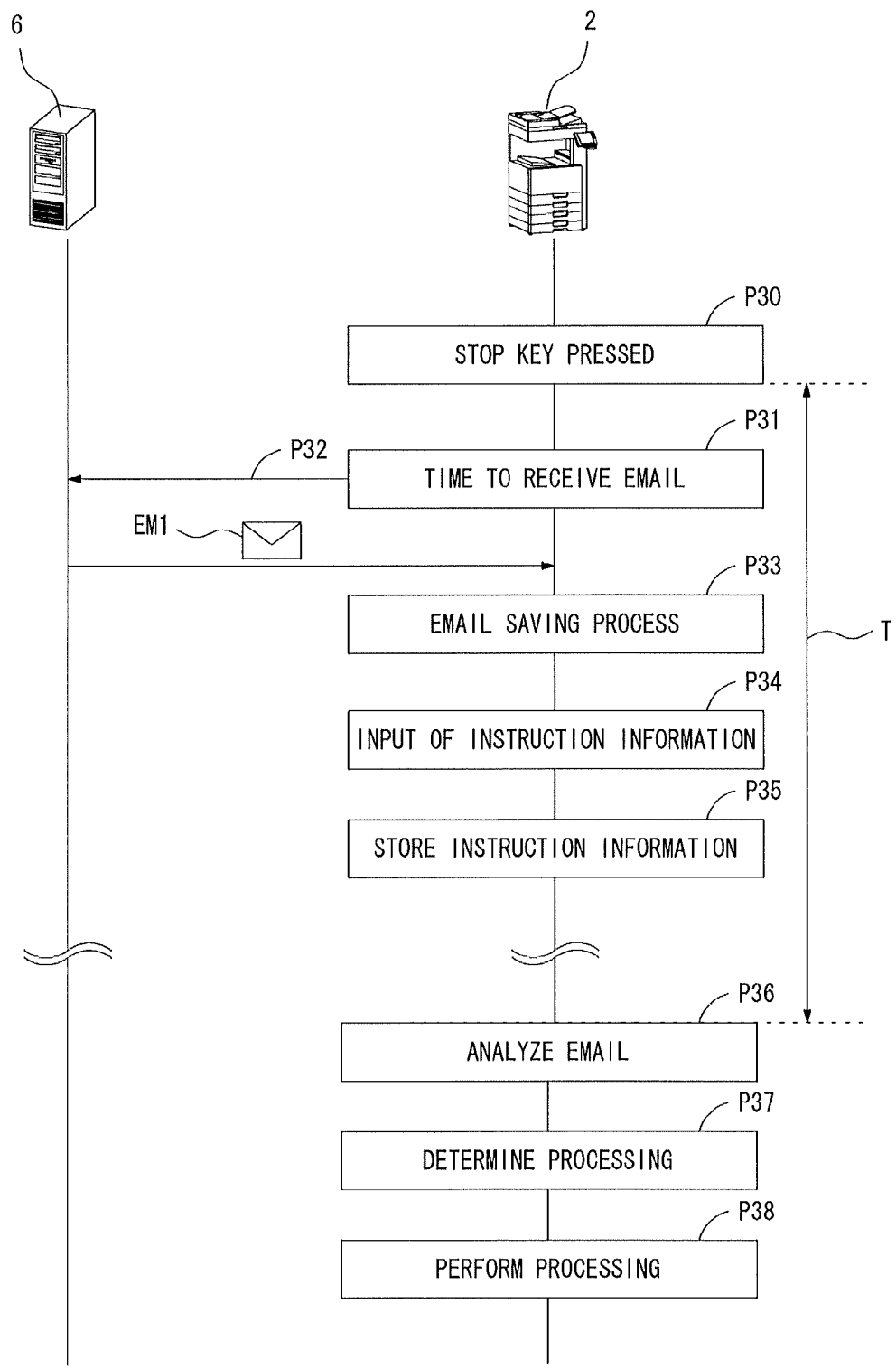
FIG. 18 is a flow diagram explaining an exemplary sequential procedure to cancel producing the printed output or to make change in the settings on the image forming apparatus of a third preferred embodiment by activating email print function.

FIG. 18 is a flow diagram explaining an exemplary sequential procedure to cancel producing the printed output or to make change in the settings performed on the image forming apparatus 2 by activating email print function. The exemplary sequential procedure of FIG. 18 characterizes the third preferred embodiment. In response to detecting that the stop key 22c is pressed by the user (process P30), the image forming apparatus 2 brings the stop controlling part 41 into operation on the controller 10 to activate the timer to start measuring the time. The stop controlling part 41 controls not to perform the process to produce the printed output by email print function until the time at which the predetermined period of time T has elapsed. In the third preferred embodiment, even before the predetermined period of time T has elapsed, the email receiving process is carried out. The image forming apparatus 2 may detect that the time to receive the email has arrived before the predetermined period of time T has elapsed (process P31). In this case, the email receiving part 31 is brought into operation to perform the email receiving process (process P32). At this time, the email receiving part 31 receives the email EM1 sent by the user by mistake. As the email receiving part 31 receives the email EM1, the image forming apparatus 2 determines whether or not the stop controlling part 41 is temporarily suspending the process. If the stop controlling part 41 is temporarily suspending the process, the image forming apparatus 2 performs the email saving process to temporarily save the received email EM1 in the storage unit 27 (process P33).

The image forming apparatus 2 brings the processing determining part 42 into operation during the temporary suspension. The processing determining part 42 receives the instruction information input by the user through the operational panel 20 while the stop controlling part 41 is temporarily suspending the process (process P34). After receiving the instruction information input by the user, the processing determining part 42 temporarily stores the received instruction information in the storage unit such as the RAM 12 (process P35). The user operates the operational panel 20 before the process to produce the printed output based on the email EM1 sent by mistake is started so that he or she is allowed to set the instruction information specifying the processing that should be carried out to process the sent email EM1.

The temporary suspension by the stop controlling part 41 is cancelled, then the processing determining part 42 is brought into operation on the controller 10. The processing determining part 42 reads the saved email EM1 and analyzes the read email EM1 (process P36). To be more specific, the processing determining part 42 determines whether or not the email EM1 saved during the temporary suspension corresponds to the set instruction information. When the email EM1 corresponds to the instruction information, the processing determining part 42 determines the processing that should be performed to process the saved email EM1 in accordance with the instruction information (process P37).

After the processing to process the email EM1 is determined by the processing determining part 42, the controller 10 brings the email processing part 43 into operation. The email processing part 43 performs the processing determined by the processing determining part 42 to process the email EM1 (process P38). More specifically, the email processing part 43 performs the processing to delete the received email EM1 or to make change in the print settings for the received email EM1 in response to determination by the processing determining part 42. When the identification information of the email received during the temporary suspension does not match the identification information registered by the user, the process to produce the printed output is carried out normally after the temporary suspension is cancelled.

The detailed operations on the image forming apparatus 2 of the third preferred embodiment is described next. In response to detecting that the stop key 22c of the operational panel 20 is pressed, the image forming apparatus 2 of the third preferred embodiment performs the process based on the flow diagram shown in FIG. 10 as well as the second preferred embodiment. As the user is inputting the instruction information, it is flagged for temporary suspension also in the third preferred embodiment.

Figure 19:
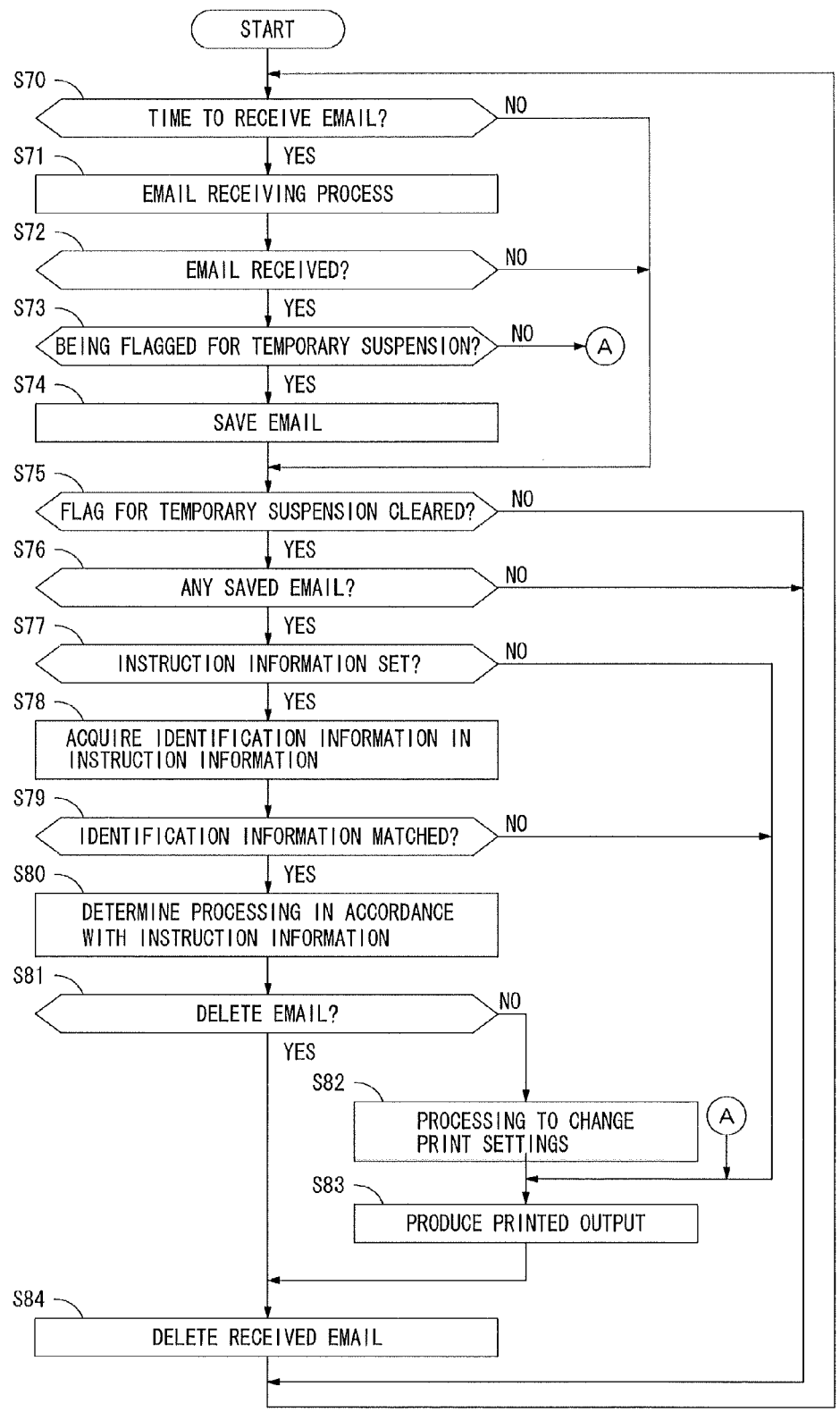
FIG. 19 is a flow diagram explaining an exemplary sequential procedure of the process repeatedly performed on the image forming apparatus of the third preferred embodiment on a regular basis.

FIG. 19 is a flow diagram explaining an exemplary sequential procedure of the process repeatedly performed on the image forming apparatus 2 of the third preferred embodiment on a regular basis. As the image forming apparatus 2 is powered on, the process explained in the flow diagram of FIG. 19 is repeatedly performed by the controller 10. In response to starting the process of FIG. 19, the controller 10 determines whether or not it is the time to receive the email (step S70). If it is not the time to receive the email, the controller 10 skips the process in steps S71 to 74. If it is the time to receive the email (when a result of step S70 is YES), the controller 10 brings the email receiving part 31 into operation to perform the email receiving process (step S71). In response to receiving no email through the email receiving process (when a result of step S72 is NO), the controller 10 skips the process in steps S73 and 74. After receiving the email through the email receiving process (when a result of step S72 is YES), the controller 10 determines if it is flagged for the temporary suspension (step S73). When it is not flagged for the temporary suspension (when a result of step S73 is NO), the controller 10 moves on to step S83 to produce the printed output based on the email EM1 received in step S71 (step S83). The controller 10 then deletes the received email EM1 after producing the printed output and completes the whole process (step S84).

When it is flagged for the temporary suspension (when a result of step S73 is YES), the controller 10 temporarily saves the received email EM1 in the storage unit 27 (step S74). The controller 10 then temporarily suspends the process to produce the printed output based on the saved email EM1.

The controller 10 then determines if the flag for temporary suspension is cleared (step S75). When the flag for temporary suspension is not cleared, the controller 10 skips the process in steps S76 to 84. When the flag for temporary suspension is cleared (when a result of step S75 is YES), the controller 10 determines whether or not the email EM1 is saved in the storage unit 27 (step S76). With no saved email EM1, the controller 10 skips the process in steps S77 to 84.

With the saved email EM1 (when a result of step S76 is YES), the controller 10 determines whether or not the instruction information input by the user is set (step S77). When the instruction information is not set (when a result of step S77 is NO), the controller 10 moves on to step S83 to read the temporarily saved email EM1 and to produce the printed output based on the read email EM1 (step S83). After the printed output is produced, the controller 10 deletes the email EM1 and completes the whole process (step S84).

There may be the set instruction information (when a result of step S77 is YES). In this case, the controller 10 acquires the identification information contained in the set instruction information (step S78), then determining whether or not the identification information of the email EM1 saved in the storage unit 27 matches the acquired identification information contained in the instruction information (step S79). If it is not considered as a match (when a result of step S79 is NO), the controller 10 produces the printed output based on the email EM1 saved in the storage unit 27 (step S83). After producing the printed output, the controller 10 deletes the received email and completes the whole process (step S84).

When the identification information of the email EM1 saved in the storage unit 27 matches the identification information contained in the instruction information (when a result of step S79 is YES), the processing determining part 42 on the controller 10 determines the processing to process the email EM1 saved in the storage unit 27 in accordance with the instruction information (step S80). The email processing part 43 is then brought into operation. The processing determined by the processing determining part 42 may be deletion of the email (when a result of step S81 is YES). In this case, the email processing part 43 deletes the email EM1 saved in the storage unit 27 and completes the whole process (step S84).

The processing determined by the processing determining part 42 may be the one other than deletion of the email (when a result of step S81 is NO). In such a case, the determined processing is considered to be the one to make change in the print settings. The email processing part 43 performs the processing to make change in the print settings for the email EM1 saved in the storage unit 27 (step S82). The controller 10 applies the updated print settings to produce the printed output based on the email EM1 saved in the storage unit 27 (step S83). The controller 10 then deletes the email EM1 saved in the storage unit 27 and completes the whole process (step S84).

In the third preferred embodiment, the operation in the second preferred embodiment is resulted by performing the above-described process on the image forming apparatus 2. More specifically, the user may send the wrong email EM1 by mistake. Even in such a case, the user inputs the instruction information after pressing the stop key 22c on the operational panel 20 relatively early, and the email EM1 is allowed to be prevented from being produced as the printed output as it is on the image forming apparatus 2. It is assumed, for example, that the user sends the wrong email EM1 by mistake from a place relatively close to the image forming apparatus 2. In this case, the user operates the operational panel 20 of the image forming apparatus 2 soon after he or she notices the mistake so that he or she is allowed to cancel the printing or to print after making change in the print settings before the image forming apparatus 2 starts producing the printed output based on the email EM1.

Even it is flagged for the temporary suspension, the image forming apparatus 2 of the third preferred embodiment accesses the POP server 6 to receive the email EM1 when the time to receive the email has arrived. The image forming apparatus 2 then saves the received email EM1 in the storage unit 27. As an example of modification of the process based on the flow diagram shown in FIG. 19, it may determine that the identification information entered by the user matches the identification information of the email EM1 saved in the storage unit 27 every time the user inputs each character of the identification information while he or she is inputting the identification information. In this case, the processing determining part 42, for example, identifies the email, which is not the target of the processing, of the emails EM1 saved in the storage unit 27 every time a character of the identification information is entered through the manipulation unit 22 of the operational panel 20. The email processing part 43 cancels the temporary suspension of the process on the email not to be the target of the processing when the email is identified by the processing determining part 42. The email processing part 43 then reads the email in the storage unit 27 and outputs the read email to the print controlling part 32, thereby allowing the print controlling part 32 to produce the printed output based on the email immediately.

Figure 20:
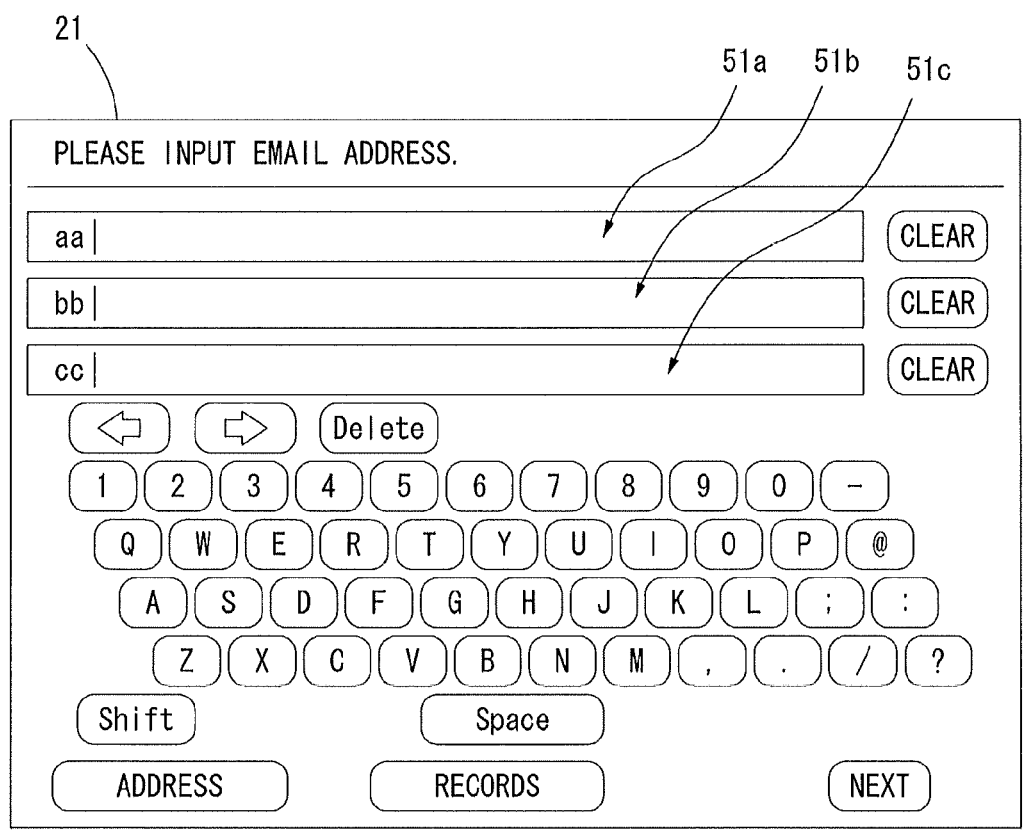
FIG. 20 shows the screen image, the same as the one of FIG. 16, as the identification information is being input in each of multiple identification fields.

FIG. 20 shows the screen image, the same as the one of FIG. 16, as the identification information is being input in each of the multiple identification fields 51a, 51b and 51c. In the example of FIG. 20, two characters "aa" are input in the identification field 51a, two characters "bb" are input in the identification field 51b and two characters "cc" are input in the identification field 51c. It is assumed, for example, the email EM1 having its source address "abc@**.*" is saved in the storage unit 27. In this case, the processing determining part 42 is allowed to detect that the initial characters of the source address of the email EM1 does not match any of the two characters input in the respective identification fields 51a, 51b and 51c. The processing determining part 42, therefore, may identify the email EM1 is not the target of the determined processing. The email processing part 43 causes the process to produce the printed output based on the email EM1 not to be the target of the determined processing identified as described above to be started immediately so that the printed output may be produced before the predetermined period of time T has elapsed.

As described above, even when the user sends the wrong email to the image forming apparatus by mistake, the print job given by the email to the image forming apparatus may be cancelled or the print settings for the print job may be changed easily. This results in less frequency of miss prints on the image forming apparatus and enhanced user-friendliness of the email print function.

(Modifications)

While the preferred embodiment of the present invention has been described above, the present invention is not limited to the preferred embodiment. Various modifications may be applied to the present invention. In the above-described preferred embodiment, the image forming apparatus 2 is shown to be one of MFPs, for example. The image forming apparatus 2 of the present invention is not necessarily the device such as the WIN. The image forming apparatus 2 may be one of network printers.

In the second and third preferred embodiments described above, after the stop key 22c is pressed by the user, the timer is activated to measure the predetermined period of time T, and the process is temporarily suspended until the time at which the predetermined period of time T has elapsed. It is not necessary to suspend the process for the predetermined period of time T measured by the timer. The process may be temporarily suspended when the first operation to press the stop key 22c by the user is detected, and the temporary suspension may be cancelled when the second operation to press the stop key 22c is detected, for example.

For the printer section 25 to actually produce the printed output, the printer section 25 firstly warms up the parts such as a fixing part, then starting the drawing process based on the data to print after warm-up is complete. This warm-up generally takes several seconds. In the third preferred embodiment described above, the later drawing process may be temporarily suspended when the stop key 22c is pressed by the user during the warm-up of the parts such as the fixing part of the printer section 25, for example.

On the system configuration illustrated in FIG. 1, the network to which each device is connected includes the internet 5. The internet 5, however, is not necessarily included in the network.

As the detailed operations of the basic preferred embodiment, the first, the second and the third preferred embodiments are described above. The image forming apparatus 2 capable of performing every operation described in the first, the second and the third preferred embodiments may also be achieved.

What is claimed is:

1. An image forming apparatus, comprising:

a receiver for receiving an email during predetermined intervals;

a printer for printing a printed output of data contained in the email received by said receiver on a recording medium:

a hardware processor configured to:

temporarily suspend the receiving process or the process to print the printed output without making the receiving process or the process to print carry out;

receive an input of an instruction specifying a particular process for the image forming apparatus to process the email received by said receiver, and determine the processing to process the email received by the receiver in accordance with said input instruction while said stop controlling part is temporarily suspending the process; and perform the processing determined by said hardware processor to process the email received by said receiver while the process is being temporarily suspended by said hardware processor or after the temporary suspension by said hardware processor is cancelled, wherein the input of the instruction is received after the receiver receives the email.

2. The image forming apparatus according to claim 1, wherein the processing determined by said hardware processor is any one of the processing to delete the received email, to change print settings for producing the printed output and to change a file to print.

3. The image forming apparatus according to claim 1, further comprising:
a storage for saving the received email, wherein
said image forming apparatus saves the received email in said storage for a predetermined period of time, thereby temporarily suspending the process to produce the printed output,
said hardware processor determines the processing to process the email saved in said storage part in accordance with said instruction when an email containing said instruction is received before said predetermined period of time has elapsed, and
said hardware processor performs the processing determined to process the email saved in said storage.

4. The image forming apparatus according to claim 3, wherein
said hardware processor compares a source address of the email containing said instruction with a source address of the email saved in said storage, thereby identifying the email to be a target of the determined processing.

5. The image forming apparatus according to claim 3, wherein
said hardware processor, in response to receiving the blank email or the email the same as the one saved in said storage as the email containing said instruction, determines the processing to delete the email saved in said storage.

6. The image forming apparatus according to claim 3, wherein
said hardware processor, when the instruction on making change in the print settings for the email saved in said storage is contained as said instruction contained in the received email, determines the processing to make change in the print settings in accordance with the instruction.

7. The image forming apparatus according to claim 3, wherein
said hardware processor, when a file attached to the email containing said instruction is different from a file attached to the email saved in said storage, determines the processing to change the file to print.

8. The image forming apparatus according to claim 1, further comprising:
a manipulation input detector for detecting input by a user, wherein
said hardware processor temporarily suspends the receiving process or the process to print the printed output when a predetermined input operation is detected by said manipulation input detector, and
said hardware processor receives the input of said instruction specifying the processing to process the received email through said manipulation input detector and determines the processing to process the received email in accordance with said input instruction while the process is being temporarily suspended.

9. The image forming apparatus according to claim 8, wherein
said hardware processor acquires identification information for identifying the email to be the target of the determined processing with information input through said manipulation input detector and identifies the email to be the target of the determined processing based on said acquired identification information.

10. The image forming apparatus according to claim 9, wherein
said identification information corresponds to the source address of the received email.

11. The image forming apparatus according to claim 9, wherein
said hardware processor is allowed to receive inputs of the plurality of identification information for identifying the multiple emails to be the targets of the determined processing through said manipulation input detector at the same time.

12. The image forming apparatus according to claim 8, further comprising:
a user authenticator for authenticating the user who operates said manipulation input detector, wherein
said hardware processor acquires said identification information for identifying the email to be the target of the determined processing from information corresponds to the user authenticated by said user authenticator and identifies the email to be the target of the determined processing based on said acquired identification information.

13. The image forming apparatus according to claim 8, further comprising:
a storage for saving the received email, wherein
said hardware processor, when the predetermined operation is detected by said manipulation input detector, saves the received email in said storage, thereby temporarily suspending the process to produce the printed output,
said hardware processor identifies the email not to be the target of the determined processing of at least one email saved in said storage every time the information is input through said manipulation input detector, and
said hardware processor cancels the temporary suspension of the process as to the email not to be the target of the determined processing as the email is identified, and outputs the email by reading the email in said storage, thereby causing said printer to produce the printed output of the data contained in the email.

14. A non-transitory computer readable recording medium on which a program is recorded, said program executable on an image forming apparatus capable of producing a printed output of data contained in a received email, said program executed on said image forming apparatus to perform the steps comprising:
receiving an email during predetermined intervals;
controlling a process to print the printed output of the data contained in the received email on a recording medium:
temporarily suspending the receiving process or the process to print the printed output without making the receiving process or the process to print carry out;
receiving an input of an instruction specifying a particular process for the image forming apparatus to process the received email, and determining the processing to process the received email in accordance with said input instruction while said image forming apparatus is temporarily suspending the process; and
performing the processing specified by said instruction to process the received email while the process is being temporarily suspended or after the temporary suspension is cancelled,
wherein the input of the instruction is received after the image forming apparatus receives the email.

15. The non-transitory computer readable recording medium according to claim 14, wherein
the processing specified by said instruction is any one of the processing to delete the email received, to change print settings for producing the printed output and to change a file to print.

16. The non-transitory computer readable recording medium according to claim 14, wherein
said image forming apparatus saves the email received in a predetermined storage part for a predetermined period of time, thereby temporarily suspending the process to print the printed output,
said image forming apparatus determines the processing to process the email saved in said storage part in accordance with said instruction when an email containing said instruction is received before said predetermined period of time has elapsed, and
said image forming apparatus performs the processing determined to process the email saved in said storage part.

17. The non-transitory computer readable recording medium according to claim 16, wherein
said image forming apparatus compares a source address of the email containing said instruction with a source address of the email saved in said storage part, thereby identifying the email to be a target of the determined processing.

18. The non-transitory computer readable recording medium according to claim 16, wherein
said image forming apparatus, in response to receiving the blank email or the email the same as the one saved in said storage part as the email containing said instruction, determines the processing to delete the email saved in said storage part.

19. The non-transitory computer readable recording medium according to claim 16, wherein
said image forming apparatus, when the instruction on making change in the print settings for the email saved in said storage part is contained as said instruction contained in the received email, determines the processing to make change in the print settings in accordance with the instruction.

20. The non-transitory computer readable recording medium according to claim 16, wherein
said image forming apparatus, when a file attached to the email containing said instruction is different from a file attached to the email saved in said storage part, determines the processing to change the file to print.

21. The non-transitory computer readable recording medium according to claim 14, wherein
said image forming apparatus includes a manipulation input detector for detecting input by a user,
said image forming apparatus temporarily suspends the receiving process or the process to print the printed output when a predetermined input operation is detected by said manipulation input detector, and
said image forming apparatus receives the input of said instruction specifying the processing to process the received email through said manipulation input detector and determines the processing to process the received email in accordance with said input instruction while the process is being temporarily suspended.

22. The non-transitory computer readable recording medium according to claim 21, wherein
said image forming apparatus acquires identification information for identifying the email to be the target of the determined processing with information input through said manipulation input detector and identifies the email to be the target of the determined processing based on said acquired identification information.

23. The non-transitory computer readable recording medium according to claim 22, wherein
said identification information corresponds to the source address of the received email.

24. The non-transitory computer readable recording medium according to claim 22, wherein
said image forming apparatus is allowed to receive inputs of the plurality of identification information for identifying the multiple emails to be the targets of the determined processing through said manipulation input detector at the same time.

25. The non-transitory computer readable recording medium according to claim 21, wherein
said image forming apparatus further includes a user authenticator for authenticating the user who operates said manipulation input part, and
said image forming apparatus acquires said identification information for identifying the email to be the target of the determined processing from information corresponds to the user authenticated by said user authenticator and identifies the email to be the target of the determined processing based on said acquired identification information.

26. The non-transitory computer readable recording medium according to claim 21, wherein
said image forming apparatus, when the predetermined operation is detected by said manipulation input detector, saves the received email in a predetermined storage, thereby temporarily suspending the process to produce the printed output,
said image forming apparatus identifies the email not to be the target of the determined processing of at least one email saved in said storage every time the information is input through said manipulation input detector, and
said email processing part cancels the temporary suspension of the process as to the email not to be the target of the determined processing as the email is identified, and outputs the email to said image forming apparatus by reading the email in said storage, thereby causing said image forming apparatus to produce the printed output of the data contained in the email.

27. The image forming apparatus according to claim 1, wherein
said image forming apparatus is configured to temporarily suspend the receiving process or the process to produce the printed output for a predetermined period.

28. The image forming apparatus according to claim 14, wherein
said image forming apparatus is configured to temporarily suspend the receiving process or the process to produce the printed output for a predetermined period.

* * * * *